US010451705B2

(12) United States Patent
Irie

(10) Patent No.: US 10,451,705 B2
(45) Date of Patent: Oct. 22, 2019

(54) TRACKING CONTROL DEVICE, TRACKING CONTROL METHOD, TRACKING CONTROL PROGRAM, AND AUTOMATIC TRACKING IMAGING SYSTEM

(71) Applicant: FUJIFILM Corporation, Tokyo (JP)

(72) Inventor: Fuminori Irie, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 108 days.

(21) Appl. No.: 15/712,563

(22) Filed: Sep. 22, 2017

(65) Prior Publication Data

US 2018/0017659 A1 Jan. 18, 2018

Related U.S. Application Data

(63) Continuation of application No. PCT/JP2015/081033, filed on Nov. 4, 2015.

(30) Foreign Application Priority Data

Mar. 26, 2015 (JP) ................. 2015-064772

(51) Int. Cl.
*G01S 3/786* (2006.01)
*H04N 5/232* (2006.01)
(Continued)

(52) U.S. Cl.
CPC ........... *G01S 3/7864* (2013.01); *H04N 5/232* (2013.01); *H04N 5/23296* (2013.01); *H04N 7/18* (2013.01); *G02B 7/08* (2013.01)

(58) Field of Classification Search
CPC .. G01S 3/7864; H04N 5/232; H04N 5/23206; H04N 5/23296; H04N 7/18; G02B 7/08
See application file for complete search history.

(56) References Cited

U.S. PATENT DOCUMENTS 5,761,326 A * 6/1998 Brady ................... G08G 1/015
340/937
5,764,786 A * 6/1998 Kuwashima ........... G01B 11/00
348/E5.042
(Continued)

FOREIGN PATENT DOCUMENTS

CN 101035273 A 9/2007
CN 101068342 A 11/2007
(Continued)

OTHER PUBLICATIONS

International Preliminary Report on Patentability and Written Opinion of the International Searching Authority (forms PCT/IB/373, PCT/ISA/237 and PCT/IB/326), dated Oct. 5, 2017, for International Application No. PCT/JP2015/081033, with an English translation of the Written Opinion.

(Continued)

*Primary Examiner* — Fernando Alcon
(74) *Attorney, Agent, or Firm* — Birch, Stewart, Kolasch & Birch, LLP

(57) ABSTRACT

An automatic tracking imaging system that remotely controls a camera in a control terminal and images a target while automatically tracking the target, the control terminal includes a target position detection unit that detects a position of the target, a control delay time estimation unit that estimates a time T at which a control delay occurs, a target position prediction unit that predicts a position of the target after the time T, a control amount calculation unit that calculates a control amount of pan and/or tilt of the camera required to move a center of an imaging screen to a predicted position of target, a determination unit that determines whether or not the target prediction position belongs to a dead zone, and an instruction unit that instructs the camera (Continued)

to execute the pan and/or tilt, and the camera is instructed to execute pan and tilt from the instruction unit.

20 Claims, 25 Drawing Sheets

(51) Int. Cl.
*H04N 7/18* (2006.01)
*G02B 7/08* (2006.01)

(56) References Cited

U.S. PATENT DOCUMENTS

| | | | | |
|---|---|---|---|---|
| 5,787,314 | A * | 7/1998 | Iwane | G02B 7/28 396/95 |
| 5,838,368 | A * | 11/1998 | Masunaga | H04N 5/23203 348/211.9 |
| 6,323,898 | B1 * | 11/2001 | Koyanagi | G01S 3/7864 348/169 |
| 7,315,631 | B1 * | 1/2008 | Corcoran | G06K 9/00234 382/118 |
| 7,349,005 | B2 | 3/2008 | Rul et al. | |
| 7,995,116 | B2 * | 8/2011 | Pillman | H04N 5/232 348/229.1 |
| 8,072,851 | B2 * | 12/2011 | Yamanaka | G02B 7/08 348/347 |
| 8,532,191 | B2 * | 9/2013 | Kim | G06K 9/32 348/169 |
| 8,965,045 | B2 * | 2/2015 | Kalevo | H04N 5/232 382/103 |
| 8,988,529 | B2 * | 3/2015 | Kokubun | G06T 7/215 348/170 |
| 9,723,192 | B1 * | 8/2017 | Sammons | H04N 5/23203 |
| 2001/0002843 | A1 * | 6/2001 | Yata | G01S 3/7803 348/169 |
| 2002/0051057 | A1 * | 5/2002 | Yata | G01S 3/7864 348/142 |
| 2002/0180871 | A1 * | 12/2002 | Shibatani | H04N 5/232 348/211.99 |
| 2007/0257990 | A1 | 11/2007 | Hayashi | |
| 2007/0268369 | A1 * | 11/2007 | Amano | H04N 7/18 348/207.99 |
| 2008/0129844 | A1 * | 6/2008 | Cusack | H04N 5/232 348/241 |
| 2008/0246830 | A1 * | 10/2008 | Martin | H04N 5/23203 348/14.02 |
| 2013/0230293 | A1 | 9/2013 | Boyle et al. | |
| 2014/0307112 | A1 * | 10/2014 | Sokeila | H04N 5/23267 348/208.6 |
| 2015/0156393 | A1 * | 6/2015 | Dai | H04N 5/232 348/143 |
| 2015/0241546 | A1 * | 8/2015 | Boyle | G11B 27/034 382/103 |
| 2016/0277646 | A1 * | 9/2016 | Carr | H04N 5/23296 |
| 2017/0094184 | A1 * | 3/2017 | Gao | H04N 5/23296 |
| 2017/0125064 | A1 * | 5/2017 | Aggarwal | G06K 9/00744 |
| 2018/0376074 | A1 * | 12/2018 | Gumpert | G06T 7/292 |

FOREIGN PATENT DOCUMENTS

| | | |
|---|---|---|
| CN | 101931753 A | 12/2010 |
| JP | 2001-333320 A | 11/2001 |
| JP | 2002-354323 A | 12/2002 |
| JP | 2004-180190 A | 6/2004 |
| JP | 2007-295175 A | 11/2007 |

OTHER PUBLICATIONS

International Search Report (form PCT/ISA/210), dated Jan. 26, 2016, for International Application No. PCT/JP2015/081033, with an English translation.

Office Action dated Aug. 1, 2019 in counterpart Chinese Patent Application No. 201580078152.6, with English translation.

* cited by examiner

FIG. 1
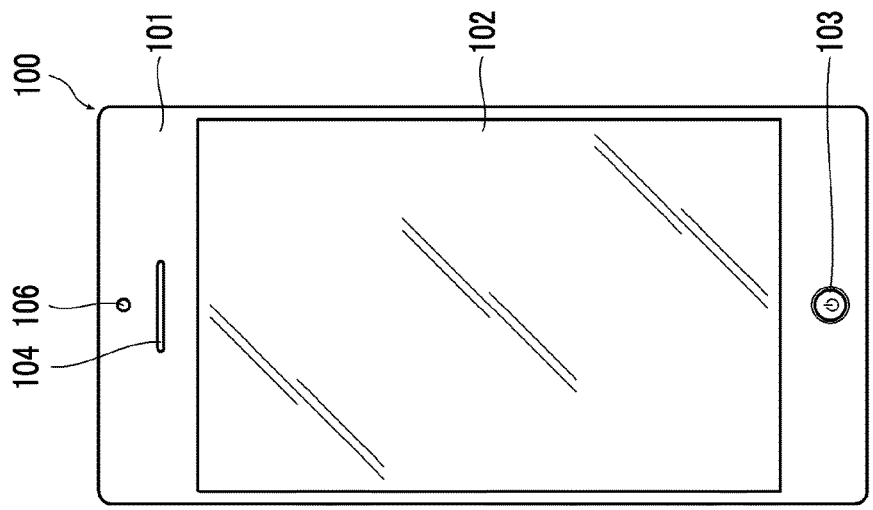
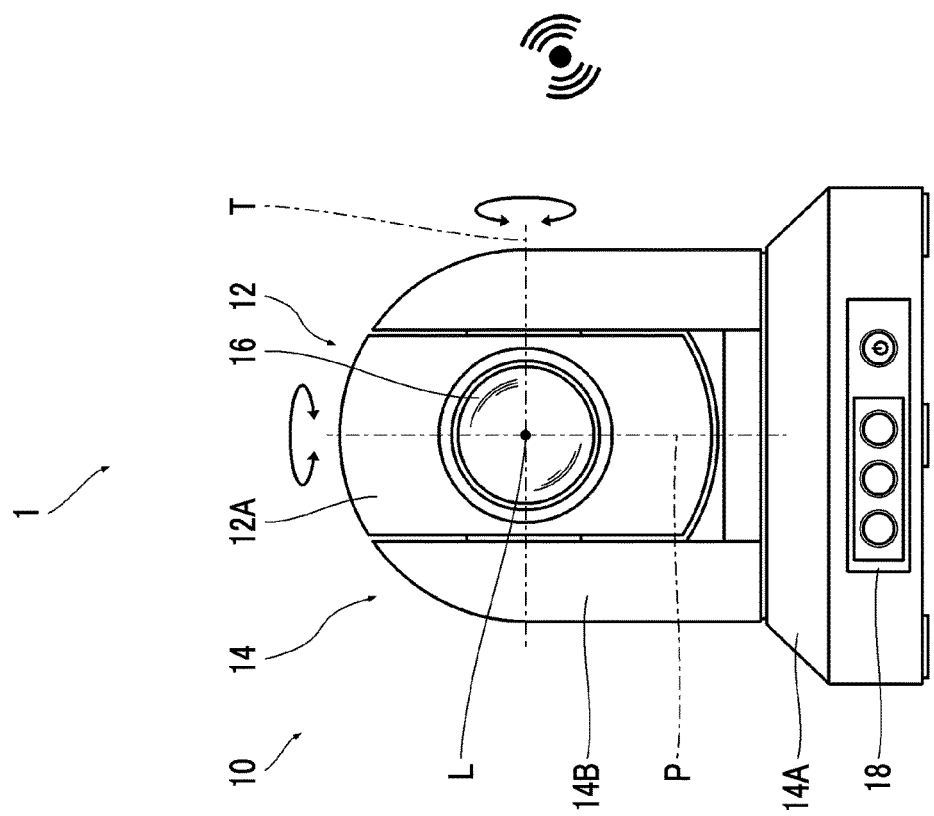

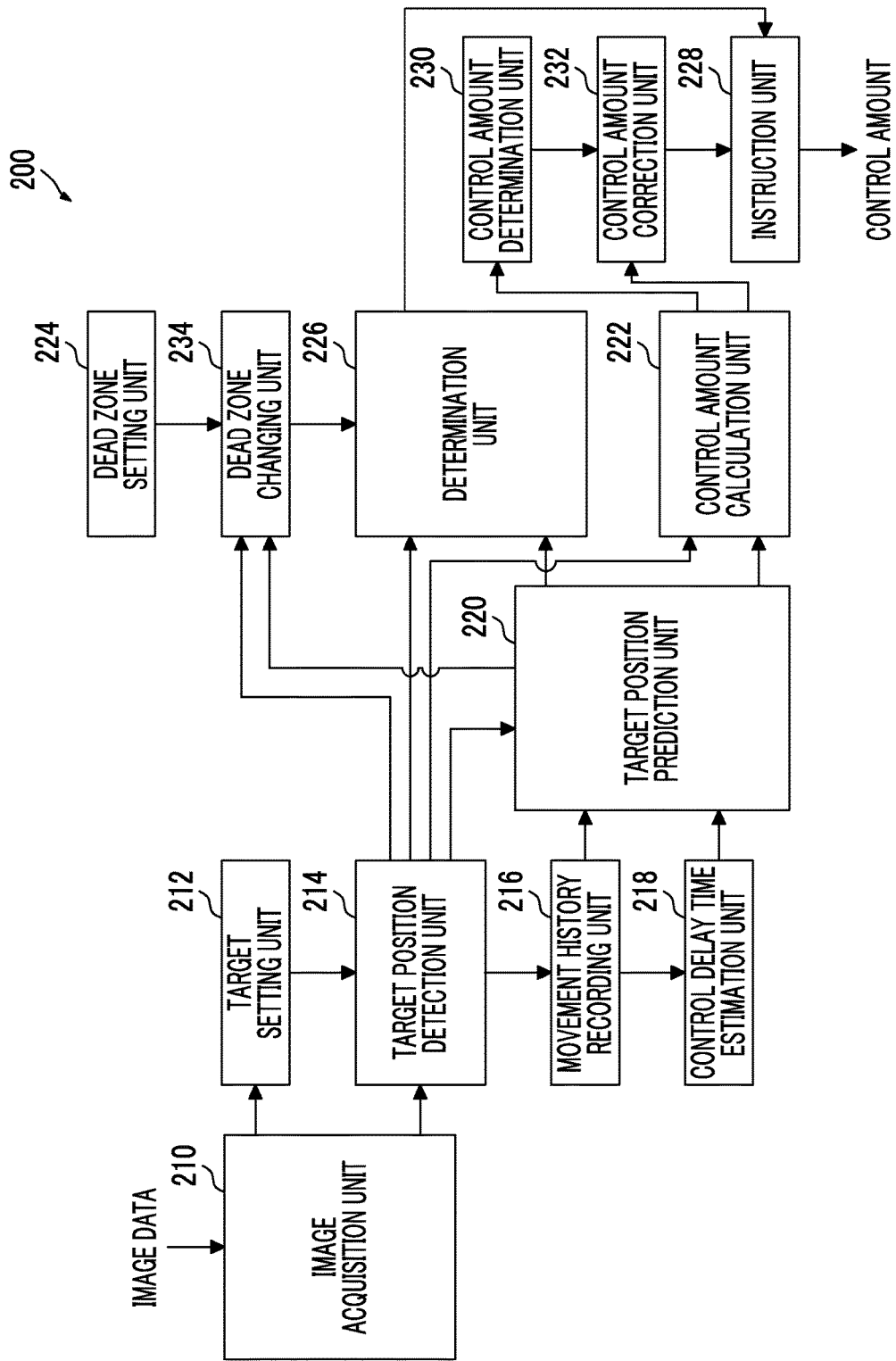

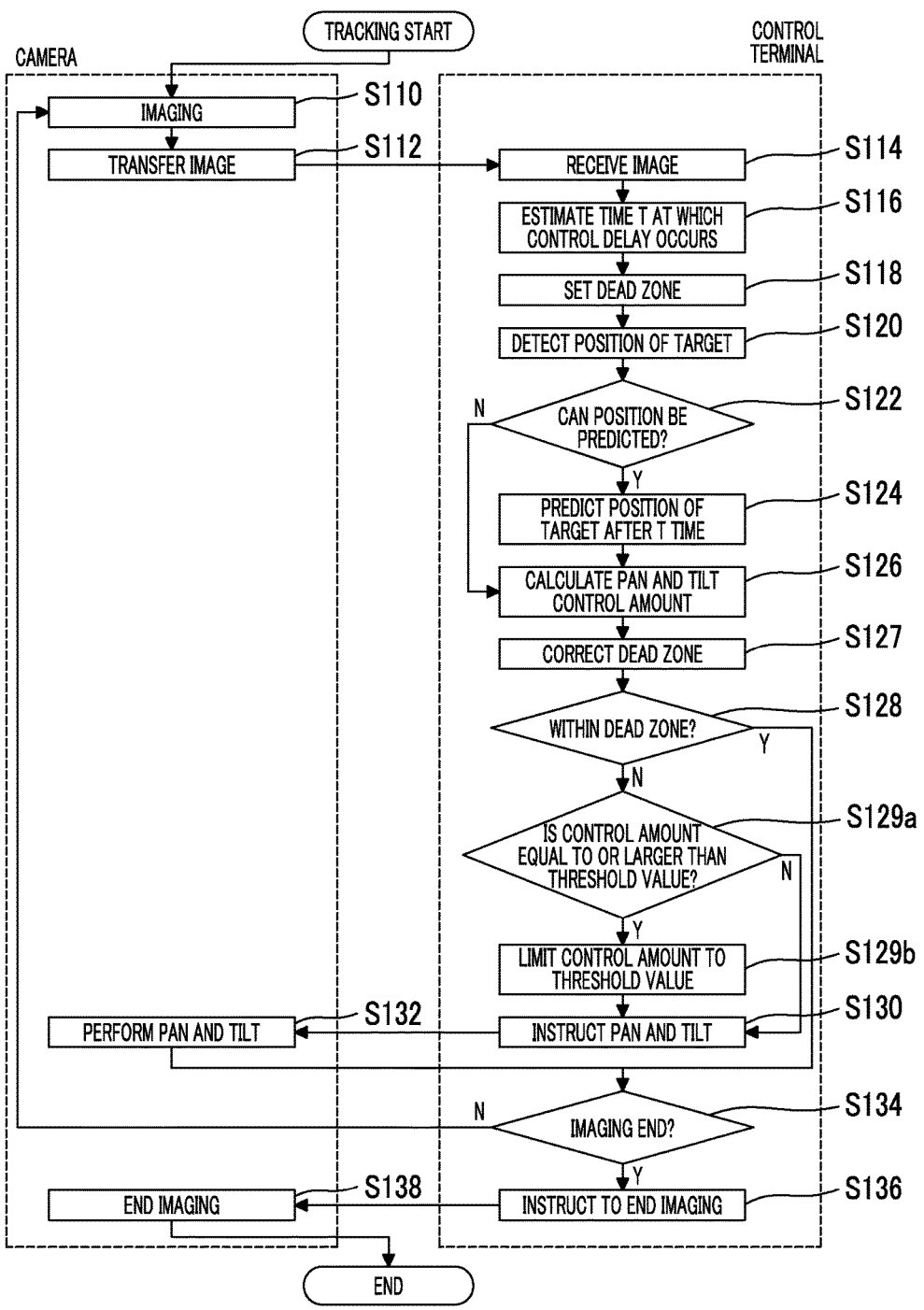

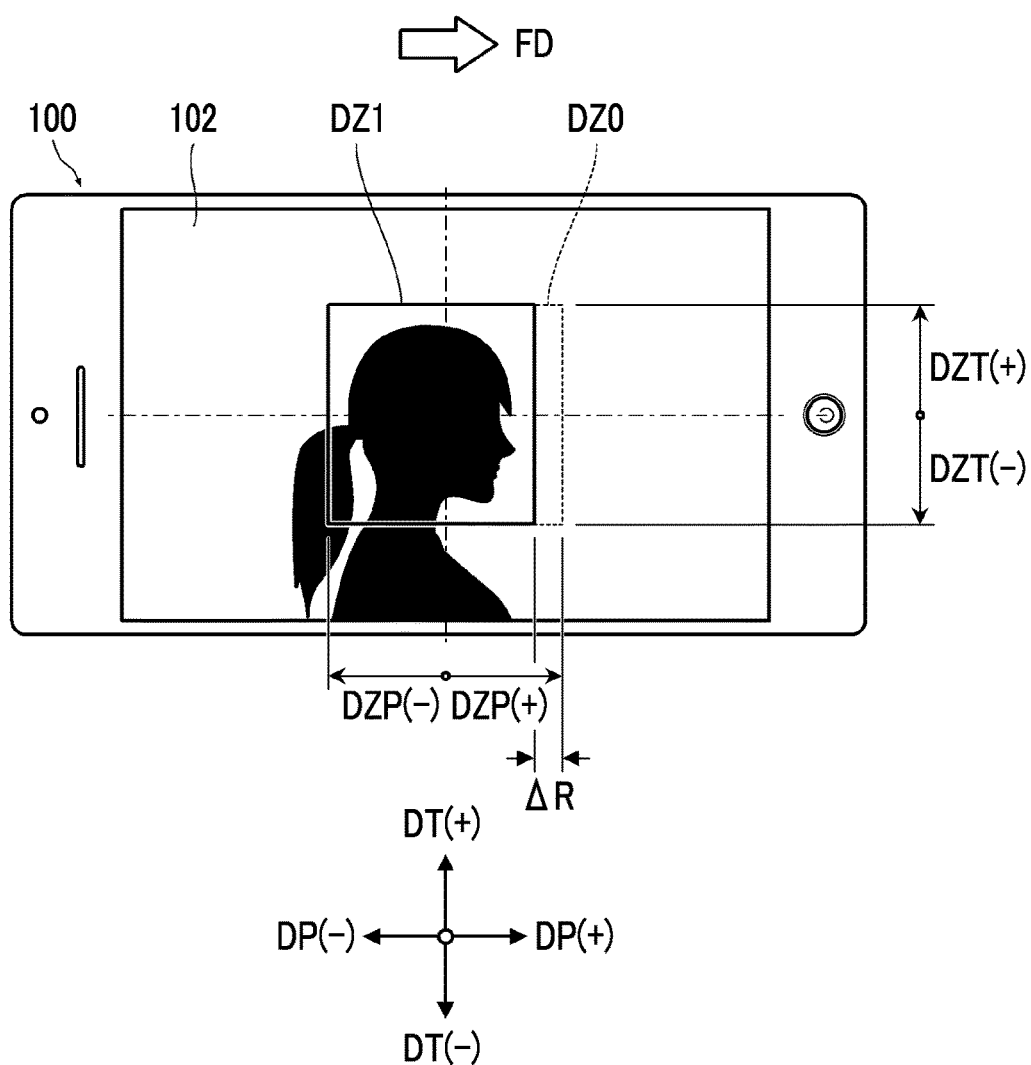

TRACKING CONTROL DEVICE, TRACKING CONTROL METHOD, TRACKING CONTROL PROGRAM, AND AUTOMATIC TRACKING IMAGING SYSTEM

CROSS-REFERENCE TO RELATED APPLICATIONS

The present application is a Continuation of PCT International Application No. PCT/JP2015/081033 filed on Nov. 4, 2015 claiming priority under 35 U.S.C. § 119(a) to Japanese Patent Application No. 2015-064772 filed on Mar. 26, 2015. Each of the above applications is hereby expressly incorporated by reference, in their entirety, into the present application.

BACKGROUND OF THE INVENTION

1. Field of the Invention

The present invention relates to a tracking control device, a tracking control method, a tracking control program, and an automatic tracking imaging system for remotely controlling pan and/or tilt of a camera and imaging a target while tracking the target.

2. Description of the Related Art

An automatic tracking imaging system that images a moving subject while automatically tracking the subject using a camera having a pan and/or tilt function is known.

Generally, in an automatic tracking imaging system, a position of a target (a subject that is a tracking target) is sequentially detected from an image captured by a camera, and pan and/or tilt of the camera is controlled so that the target is always located at a center of an imaging screen.

JP2007-295175A describes that in such an automatic tracking imaging system, a motion of a target is predicted and pan and tilt are controlled. That is, JP2007-295175A describes that a position of a target after a predetermined time is predicted and the pan and tilt of the camera are controlled. Further, JP2007-295175A describes that low-pass filter processing is performed on a pan and tilt command value output to the camera to thereby attenuate a high frequency motion and achieve a smooth motion of the image.

SUMMARY OF THE INVENTION

Incidentally, in such an automatic tracking imaging system, a system in which a camera is remotely controlled by a control terminal and the camera is caused to track a target. However, in such a system that remotely controls the camera, there is a problem in that an irregular control delay occurs according to a state of communication between the camera and the control terminal. In JP2007-295175A, a motion of the target is predicted and the pan and tilt of the camera are controlled, but there is a drawback in that it is not possible to cope with a case where the irregular control delay occurs since the prediction is performed after a certain time.

Such irregular control delay also occurs when the control terminal is executing a plurality of processes in parallel. That is, when the camera is remotely controlled by a computer that executes a plurality of processes in parallel using one central processing unit (CPU), the irregular control delay occurs according to a use state of the CPU.

Further, there is a problem in that frequent small shaking easily occurs if the motion of the target is predicted and the pan and/or tilt of the camera is controlled. That is, there is a problem in that an error occurs due to prediction and frequent small shaking occurs easily in order to correct this error. JP2007-295175A discloses a scheme of attenuating a high frequency motion by performing low pass filter processing on a pan and tilt command value to be output to the camera. Therefore, it is not possible to effectively prevent low-frequency motion with a small motion.

The present invention has been made in view of the above circumstances, and an object thereof is to provide a tracking control device, a tracking control method, a tracking control program, and an automatic tracking imaging system that have high following performance and are capable of imaging a high-quality moving image.

Means for solving the above problem is as follows.

(1) A tracking control device that remotely controls a pan and/or tilt operation of a camera having a pan and/or tilt function and causes the camera to track a target, the tracking control device comprising: a target position detection unit that detects a position of the target on the basis of an image captured by the camera; a control delay time estimation unit that estimates a time T at which a control delay occurs on the basis of at least a state of communication with the camera; a target position prediction unit that predicts a position of the target after the time T as a target prediction position; a control amount calculation unit that calculates a control amount of pan and/or tilt of the camera required to move a target arrangement position set in an imaging screen of the camera as a position at which the target is arranged, to the target prediction position; a determination unit that determines whether or not the target prediction position belongs to a dead zone set with reference to the target arrangement position; and an instruction unit that instructs the camera to execute the pan and/or tilt with the control amount in a case where the determination unit determines that the target prediction position does not belong to the dead zone.

According to this aspect, the position of the target is predicted in consideration of a control delay due to communication. Pan and/or tilt of the camera is controlled on the basis of the target prediction position. Accordingly, even in a case where the control delay is caused by communication, the camera can be caused to follow accurately. Further, according to this aspect, the dead zone is set, and the camera is set not to follow for a motion of the target that is predicted in the dead zone. Thus, it is possible to prevent the camera from moving little by little and to capture a high-quality moving image.

(2) The tracking control device of (1), wherein the control delay time estimation unit further estimates a time T at which a control delay occurs on the basis of an operation state of the target position detection unit.

According to this aspect, the position of the target is also predicted in consideration of the operation state of the target position detection unit. When it takes time to detect the position of the target, a control delay occurs correspondingly. By predicting the position of the target in consideration of the operation state of the target position detection unit, the position of the target can be predicted with higher accuracy. Accordingly, it is possible to further improve following performance.

(3) The tracking control device of (1) or (2), wherein the target position prediction unit predicts the target prediction position on the basis of a movement history of the target.

According to this aspect, the target prediction position is predicted on the basis of the movement history of the target.

By analyzing the movement history of the target, it is possible to accurately predict the position of the target after the T time to some extent. Accordingly, it is possible to achieve control with high following performance.

(4) The tracking control device of any one of (1) to (3) further comprising: a control amount correction unit that corrects the control amount to a threshold value in a case where the control amount is equal to or larger than the threshold value.

According to this aspect, when the control amount equal to or greater than the threshold value is calculated, the control amount is limited to the threshold value. That is, a range in which pan and/or tilt can be performed in one operation is limited to a certain range. Accordingly, even in a case where an error between an actual position and the predicted position is great, it is possible to prevent the camera from suddenly greatly moving and to capture a high-quality moving image without discomfort.

(5) The tracking control device of (4), wherein the threshold value is set to the same value as a size of the dead zone that is set with reference to the target arrangement position.

According to this aspect, the range in which pan and/or tilt can be performed in one operation is set to the same value as a size of the dead zone. In the present invention, the "same value" includes not only a case where values are exactly the same, but also a case where values can be regarded as substantially the same. That is, the same value is a concept including almost the same value.

(6) The tracking control device of any one of (1) to (5), further comprising: a dead zone changing unit that changes the dead zone.

According to this aspect, the dead zone can be changed. Accordingly, it is possible to appropriately set the dead zone according to a situation and to capture a higher-quality moving image.

(7) The tracking control device of (6), wherein the dead zone changing unit acquires information on a speed of the target and increases or decreases the dead zone according to the speed of the target.

According to this aspect, the dead zone is increased or decreased according to a speed of the target. In this case, the dead zone is decreased as the target speed increases.

(8) The tracking control device of (6) or (7), wherein the dead zone changing unit acquires information on an acceleration of the target and increases or decreases the dead zone according to the acceleration of the target.

According to this aspect, the dead zone is increased or decreased according to an acceleration of the target. In this case, the dead zone is decreased as the target acceleration increases.

(9) The tracking control device of any one of (6) to (8), wherein the dead zone changing unit acquires information on a size of the target and increases or decreases the dead zone according to the size of the target.

According to this aspect, the dead zone is increased or decreased according to a size of the target. In this case, the dead zone is decreased as the size of the target increases.

(10) The tracking control device of any one of (6) to (9), wherein the dead zone changing unit acquires information on a distance from the camera to the target and increases or decreases the dead zone according to the distance from the camera to the target.

According to this aspect, the dead zone is increased or decreased according to the distance from the camera to the target. In this case, the dead zone is decreased as the distance from the camera to the target is shorter.

(11) The tracking control device of any one of (6) to (10), wherein the target is a person, and the dead zone changing unit acquires information on an orientation of a face of the person, and decreases the dead zone in the same direction as the orientation of the face of the person.

According to this aspect, when the target is a person, the dead zone in the same direction as the orientation of the face of the person is decreased.

(12) The tracking control device of any one of (6) to (11), wherein the dead zone changing unit acquires information on the target prediction position, and decreases the dead zone in a direction in which the target is predicted to move.

According to this aspect, the dead zone in a direction in which the target is predicted to move is decreased.

(13) The tracking control device of (12), wherein the dead zone changing unit acquires information on the control amount, and increases or decreases the dead zone according to magnitude of the control amount.

According to this aspect, in a case where the dead zone in the direction in which the target is predicted to move is decreased, a size of the dead zone is increased or decreased according to the control amount of pan and/or tilt. That is, the dead zone is decreased as the control amount increases.

(14) The tracking control device of any one of (6) to (13), further comprising: a predictiton reliability calculation unit that calculates a degree of reliability of prediction of the target position prediction unit, wherein the dead zone changing unit increases or decreases the dead zone according to the degree of reliability calculated by the prediction degree of reliability calculation unit.

According to this aspect, the degree of reliability of prediction is calculated, and the dead zone is decreased or increased according to the calculated degree of reliability. In this case, the dead zone is increased as the degree of reliability decreases.

(15) The tracking control device of any one of (1) to (14), further comprising: a display unit that displays an image captured by the camera.

According to this aspect, a display unit that displays an image captured by the camera is included. Accordingly, it is possible to confirm the image captured by the camera.

(16) The tracking control device of (15), further comprising: an input unit that designates a position on a display screen of the display unit; and a target setting unit that sets a subject at the position designated by the input unit as the target.

According to this aspect, the subject that is a target can be set on the display screen of the display unit. Accordingly, it is possible to simply set the target.

(17) The tracking control device of any one of (1) to (16), further comprising: a face detection unit that detects a face of a person from an image captured by the camera; and a target setting unit that sets the face of the person detected by the face detection unit as the target.

According to this aspect, the face of the person detected from the image is set as the target. Accordingly, the person can be simply tracked as a target.

(18) The tracking control device of any one of (1) to (17), wherein the camera comprises: an imaging unit that captures an optical image of the subject through a lens; and a head portion that pans and/or tilts the imaging unit.

According to this aspect, a panning and/or tilting function is provided by mechanically panning and/or tilting the imaging unit.

(19) The tracking control device of any one of (1) to (17), wherein the camera includes an imaging unit that captures an optical image of a subject through a lens; and an image cutout unit that cuts out a part of the image captured by the imaging unit, and are electronically panned and/or tilted by moving a position of the image cut out by the image cutout unit.

According to this aspect, pan and/or tilt is electronically performed by cutting out an image. In this case, it is preferable for imaging to be performed using a wide angle lens such as a fisheye lens.

(20) A tracking control method of remotely controlling a pan and/or tilt operation of a camera having a pan and/or tilt function at a control terminal and causing the camera to track a target, the tracking control method comprising the steps of: detecting a position of the target on the basis of an image captured by the camera; estimating a time T at which a control delay occurs on the basis of at least a state of communication between the camera and the control terminal; predicting a position of the target after the time T as a target prediction position; calculating a control amount of pan and/or tilt of the camera required to move a target arrangement position set in an imaging screen of the camera as a position at which the target is arranged, to the target prediction position; determining whether or not the target prediction position belongs to a dead zone set with reference to the target arrangement position; and instructing the camera to execute the pan and/or tilt with the control amount in a case where the target prediction position is determined not to belong to the dead zone.

According to this aspect, the position of the target is predicted in consideration of a control delay due to communication. Pan and/or tilt of the camera is controlled on the basis of the target prediction position. Accordingly, even in a case where the control delay is caused by communication, the camera can be caused to follow accurately. Further, according to this aspect, the dead zone is set, and the camera is set not to follow for a motion of the target that is predicted in the dead zone. Thus, it is possible to prevent the camera from moving little by little and to capture a high-quality moving image.

(21) A tracking control program for remotely controlling a pan and/or tilt operation of a camera having a pan and/or tilt function and causing the camera to track a target, the tracking control program causes a computer to realize: a function of acquiring an image captured by the camera; a function of detecting a position of the target on the basis of the acquired image; a function of estimating a time T at which a control delay occurs on the basis of at least a state of communication with the camera; a function of predicting a position of the target after the time T as a target prediction position; a function of calculating a control amount of pan and/or tilt of the camera required to move a target arrangement position set in an imaging screen of the camera as a position at which the target is arranged, to the target prediction position; a function of determining whether or not the target prediction position belongs to a dead zone set with reference to the target arrangement position; and a function of instructing the camera to execute the pan and/or tilt with the control amount in a case where the target prediction position is determined not to belong to the dead zone.

According to this aspect, the position of the target is predicted in consideration of a control delay due to communication. Pan and/or tilt of the camera is controlled on the basis of the target prediction position. Accordingly, even in a case where the control delay is caused by communication, the camera can be caused to follow accurately. Further, according to this aspect, the dead zone is set, and the camera is set not to follow for a motion of the target that is predicted in the dead zone. Thus, it is possible to prevent the camera from moving little by little and to capture a high-quality moving image.

(22) An automatic tracking imaging system that remotely controls a pan and/or tilt operation of a camera having a pan and/or tilt function in a control terminal and images a target while automatically tracking the target, wherein the control terminal comprises a target position detection unit that detects a position of the target on the basis of an image captured by the camera; a control delay time estimation unit that estimates a time T at which a control delay occurs on the basis of at least a state of communication with the camera; a target position prediction unit that predicts a position of the target after the time T as a target prediction position; a control amount calculation unit that calculates a control amount of pan and/or tilt of the camera required to move a target arrangement position set in an imaging screen of the camera as a position at which the target is arranged, to the target prediction position; a determination unit that determines whether or not the target prediction position belongs to a dead zone set with reference to the target arrangement position; and an instruction unit that instructs the camera to execute the pan and/or tilt with the control amount in a case where the target prediction position is determined not to belong to the dead zone.

According to this aspect, the position of the target is predicted in consideration of a control delay due to communication. Pan and/or tilt of the camera is controlled on the basis of the target prediction position. Accordingly, even in a case where the control delay is caused by communication, the camera can be caused to follow accurately. Further, according to this aspect, the dead zone is set, and the camera is set not to follow for a motion of the target that is predicted in the dead zone. Thus, it is possible to prevent the camera from moving little by little and to capture a high-quality moving image.

According to the present invention, following performance is high, and it is possible to capture a high-quality moving image.

BRIEF DESCRIPTION OF THE DRAWINGS

FIG. 1 is a system configuration diagram illustrating an embodiment of an automatic tracking imaging system according to the present invention.

FIG. 16 is a block diagram illustrating a system configuration of a control terminal functioning as a tracking control device of a third embodiment.

FIG. 18 is a flowchart illustrating a procedure of tracking control according to a third embodiment.

FIG. 20 is a conceptual diagram of a method of increasing or decreasing a dead zone according to an orientation of a face of a person which is a target.

DESCRIPTION OF THE PREFERRED EMBODIMENTS

Figure 2:
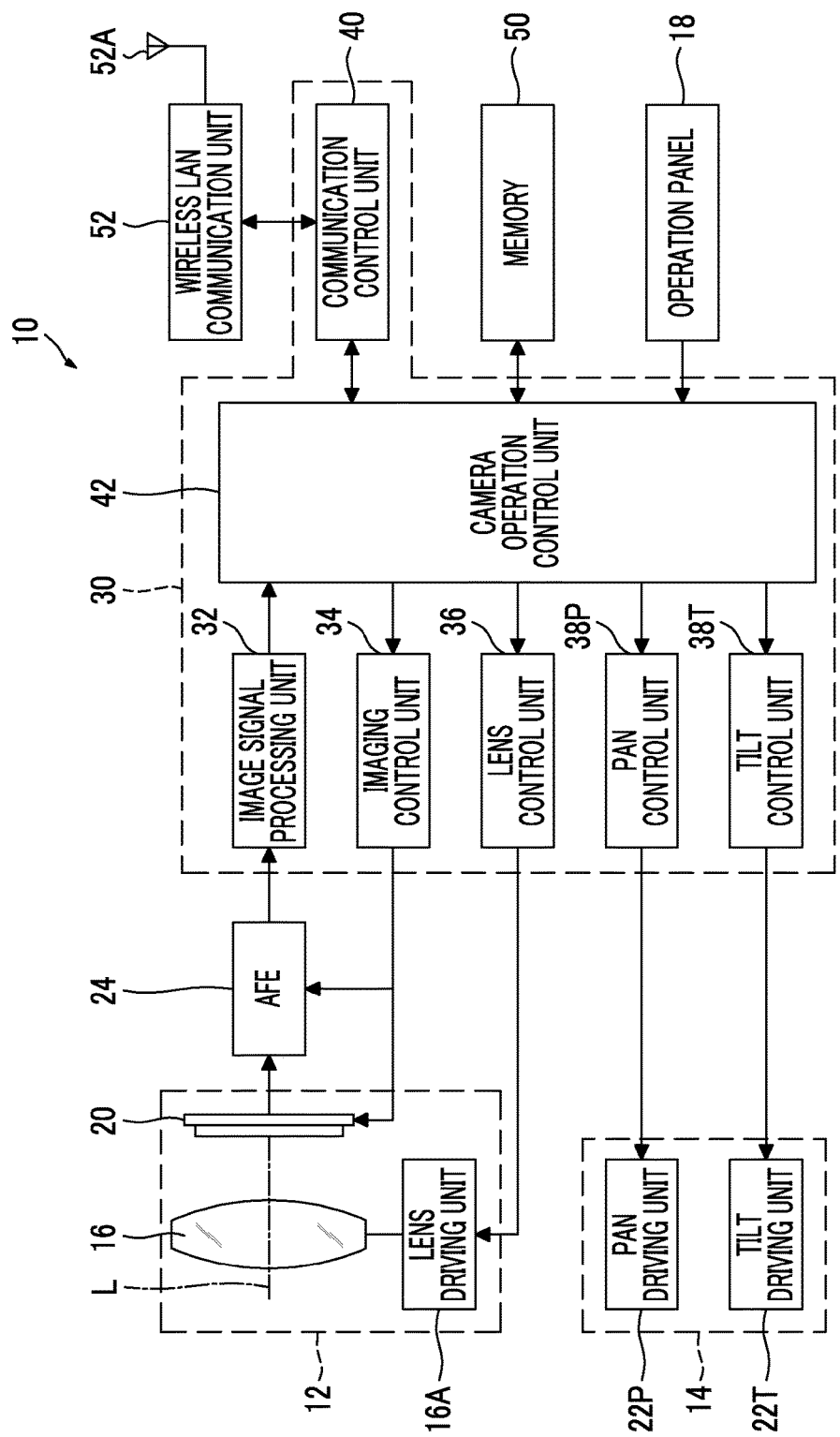
FIG. 2 is a block diagram illustrating a system configuration of a camera.

Hereinafter, preferred embodiments for carrying out the present invention will be described in detail with reference to the accompanying drawings.

<<System Configuration>>

FIG. 1 is a system configuration diagram illustrating an embodiment of an automatic tracking imaging system according to the present invention.

As illustrated in FIG. 1, an automatic tracking imaging system 1 according to this embodiment includes a camera 10 having a pan function and a tilt function, and a control terminal 100 that remotely controls an operation of the camera 10.

<Camera>

The camera 10 includes an imaging unit 12 and a head portion 14.

[Imaging Unit of Camera]

The imaging unit 12 includes a housing 12A, and includes a lens 16 and an image sensor (not illustrated) inside the housing 12A.

The lens 16 has a focusing function and a zooming function. A focus of the lens 16 is adjusted by moving a portion of an optical system back and forth along an optical axis L using a lens driving unit (not illustrated). Further, zoom of the lens 16 is adjusted by moving a portion of the optical system back and forth along the optical axis L. Further, zoom is adjusted by moving a portion of the optical system back and forth along the optical axis L using the lens driving unit (not illustrated).

The image sensor receives light passing through the lens 16. The image sensor includes, for example, a two-dimensional image sensor such as a CCD image sensor (CCD: Charge Coupled Device) or a CMOS image sensor (CMOS: Complementary Metal Oxide Semiconductor).

[Head Portion of Camera]

The head portion 14 supports the imaging unit 12 so that the imaging unit 12 can be panned and tilted. The head portion 14 includes a base frame 14A and a rotating frame 14B.

The base frame 14A is a base portion, and rotatably supports the rotating frame 14B. The rotating frame 14B is supported rotatably about a pan axis P with respect to the base frame 14A.

The rotating frame 14B is a support portion of the imaging unit 12 and rotatably supports the imaging unit 12. The imaging unit 12 is supported rotatably about the tilt axis T with respect to the rotating frame 14B. This tilt axis T is orthogonal to the pan axis P and orthogonal to the optical axis L of the imaging unit 12.

The base frame 14A includes a built-in pan driving unit (not illustrated). The pan driving unit includes, for example, a motor. The rotating frame 14B is driven by the pan driving unit and rotates about the pan axis P.

Further, a tilt driving unit (not illustrated) is built into the rotating frame 14B. The tilt driving unit includes, for example, a motor. The imaging unit 12 is driven by the tilt driving unit and rotates about the tilt axis T.

The imaging unit 12 is panned when the pan driving unit is driven, and is tilted when the tilt driving unit is driven. An angle at which the imaging unit 12 can be panned is, for example, 270° (±135°), and an angle at which the imaging unit 12 can be tilted is 135° (−45° to +90°).

The base frame 14A includes an operation panel 18. The operation panel 18 includes various operation members such as a power button. Various operations of the camera 10 are performed via the operation panel 18.

[System Configuration of Camera]

FIG. 2 is a block diagram illustrating a system configuration of the camera.

As illustrated in FIG. 2, the camera 10 includes an analog front end (AFE) 24, a camera control unit 30, a memory 50, and a wireless LAN communication unit (LAN: Local Area Network) 52.

The AFE 24 performs, for example, signal processing such as noise removal, signal amplification, or A/D conversion (A/D: Analog/Digital) on the signal (image signal) output from the image sensor 20 of the imaging unit 12. A digital image signal generated by the AFE 24 is output to the camera control unit 30.

The camera control unit 30 includes a microcomputer including a central processing unit (CPU) and a memory, and executes a predetermined program to function as an image signal processing unit 32, an imaging control unit 34, a lens control unit 36, a pan control unit 38P, a tilt control unit 38T, a communication control unit 40, and a camera operation control unit 42.

The image signal processing unit 32 performs required signal processing on the digital image signal acquired from the AFE 24, to generate digital image data. For example, the image signal processing unit 32 generates digital image data including image data of a luminance signal (Y) and image data of a color difference signal (Cr, Cb).

The imaging control unit 34 controls driving of the image sensor 20 to control imaging of the image sensor 20.

The lens control unit 36 controls the lens driving unit 16A to control operation of focus, zoom, and an iris of the lens 16.

The pan control unit 38P controls driving of the pan driving unit 22P to control a panning operation of the camera 10.

The tilt control unit 38T controls driving of the tilt driving unit 22T to control a tilting operation of the camera 10.

The communication control unit 40 controls the wireless LAN communication unit 52 to control wireless LAN communication with an external device. In the automatic tracking imaging system 1 of this embodiment, communication with the control terminal 100 that is an external device is controlled.

The camera operation control unit 42 generally controls an operation of the entire camera according to an instruction from the operation panel 18 and the control terminal 100.

The memory 50 functions as a storage unit for various pieces of data, and data is written and read according to a request from the camera operation control unit 42.

The wireless LAN communication unit 52 performs wireless LAN communication according to a predetermined wireless LAN standard (for example, IEEE802.11a/b/g/n standard [IEEE: The Institute of Electrical and Electronics Engineers, Inc./US Institute of Electrical and Electronics Engineers]) with a wireless LAN access point or an external device capable of wireless LAN communication, via an antenna 52A.

<Control Terminal>

The control terminal 100 includes a so-called smart phone, and includes a display 102, an operation button 103, a speaker 104, a microphone 105 (see FIG. 3), and a built-in camera 106, and the like in a rectangular plate-shaped housing 101, as illustrated in FIG. 1.

Figure 3:
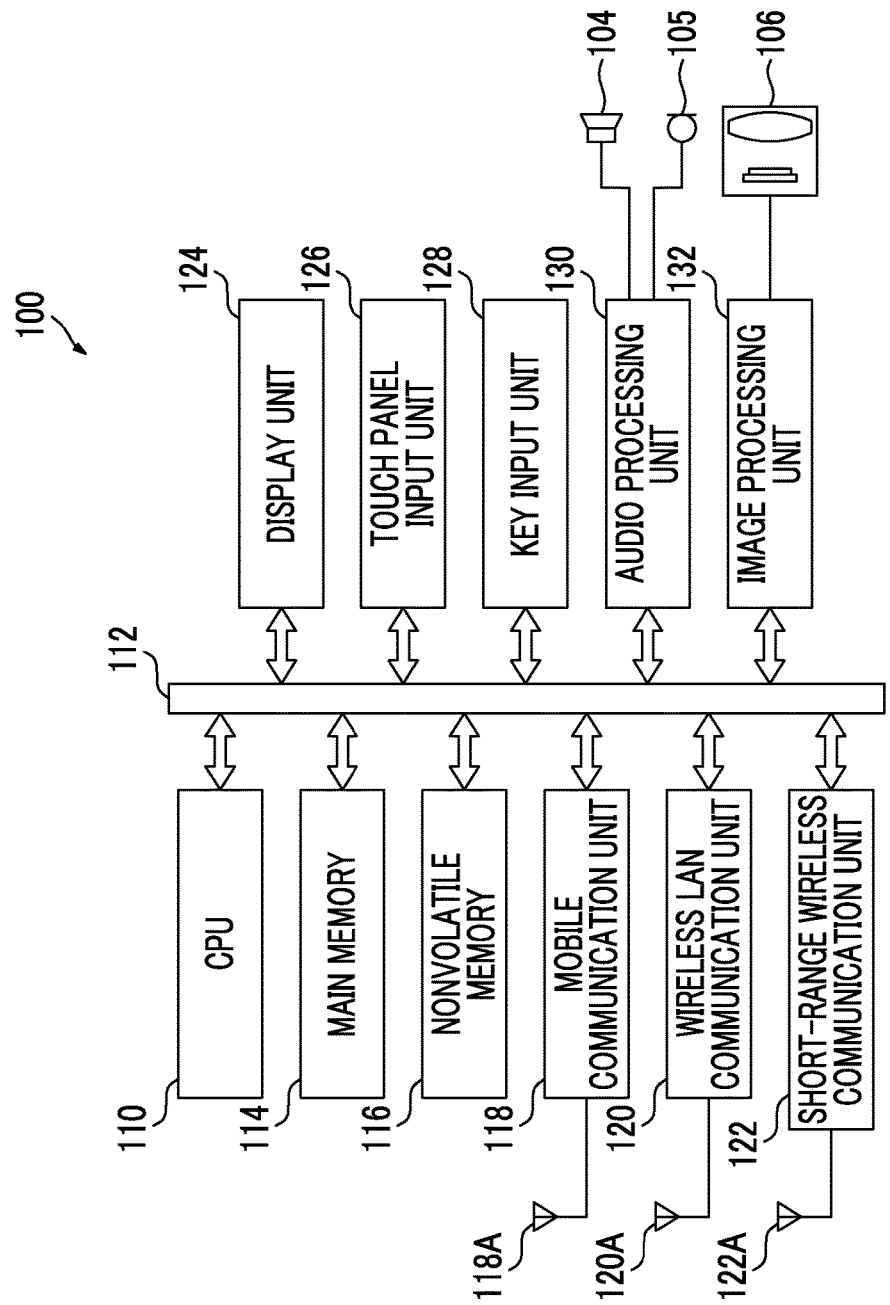
FIG. 3 is a block diagram illustrating a system configuration of a control terminal.

FIG. 3 is a block diagram illustrating a system configuration of the control terminal.

As illustrated in FIG. 3, the control terminal 100 includes a CPU 110 that controls an overall operation of the control terminal 100, and has a configuration in which, for example, a main memory 114, a nonvolatile memory 116, a mobile communication unit 118, a wireless LAN communication unit 120, a short-range wireless communication unit 122, a display unit 124, a touch panel input unit 126, a key input unit 128, an audio processing unit 130, and an image processing unit 132 are connected to the CPU 110 via a system bus 112.

The CPU 110 reads an operation program (an operating system (OS) and an application program operating on the OS), fixed form data, and the like stored in the nonvolatile memory 116, loads these to the main memory 114, and executes the operation program, to function as a control unit that controls an overall operation of the control terminal.

The main memory 114 includes, for example, a random access memory (RAM), and functions as a work memory of the CPU 110.

The nonvolatile memory 116 includes, for example, a flash EEPROM (EEPROM: Electrically Erasable Programmable Read Only Memory), and stores the above-described operation program or various fixed form data. Further, the nonvolatile memory 116 functions as a storage unit of the control terminal 100 and stores various pieces of data.

The mobile communication unit 118 executes transmission and reception of data to and from a nearest base station (not illustrated) via an antenna 118A on the basis of a third generation mobile communication system conforming to an IMT-2000 standard (International Mobile Telecommunication-2000) and a fourth generation mobile communication system conforming to an IMT-Advance standard (International Mobile Telecommunications-Advanced).

The wireless LAN communication unit 120 performs wireless LAN communication according to a predetermined wireless LAN communication standard (for example, IEEE802.11a/b/g/n standards) with a wireless LAN access point or an external device capable of wireless LAN communication, via an antenna 120A.

The short-range wireless communication unit 122 executes transmission and reception of data to and from a device conforming to another Bluetooth (registered trademark) standard that is, for example, in a range of (within a radius of about 10 m) of Class 2 via the antenna 122A.

The display unit 124 includes a color liquid crystal panel constituting the display 102, and a driving circuit therefor, and displays various images.

The touch panel input unit 126 is an example of an input unit. The touch panel input unit 126 is integrally formed with the display 102 using a transparent electrode. The touch panel input unit 126 generates and outputs two-dimensional position coordinate information corresponding to a touch operation when the user touches the display screen of the display 102. That is, the touch panel input unit 126 outputs coordinate information on a position on the display screen of the display 102 designated by touching.

The key input unit 128 includes a plurality of key switches including the operation button 103 included in the housing 101 of the control terminal 100, and a driving circuit therefor.

The audio processing unit 130 converts digital audio data provided via the system bus 112 into an analog signal and outputs the analog signal from the speaker 104. Further, the audio processing unit 130 samples the analog sound signal input from the microphone 105 into digital data and outputs the digital data.

The image processing unit 132 converts an analog image signal output from the built-in camera 106 including a lens and an image sensor into a digital image signal, performs required signal processing on the digital image signal, and outputs a resultant image signal.

<Tracking Control Device>

In the automatic tracking imaging system 1 of this embodiment, the CPU 110 of the control terminal 100 executes a predetermined tracking control program, and accordingly, the control terminal 100 functions as a tracking control device 200.

Figure 4:
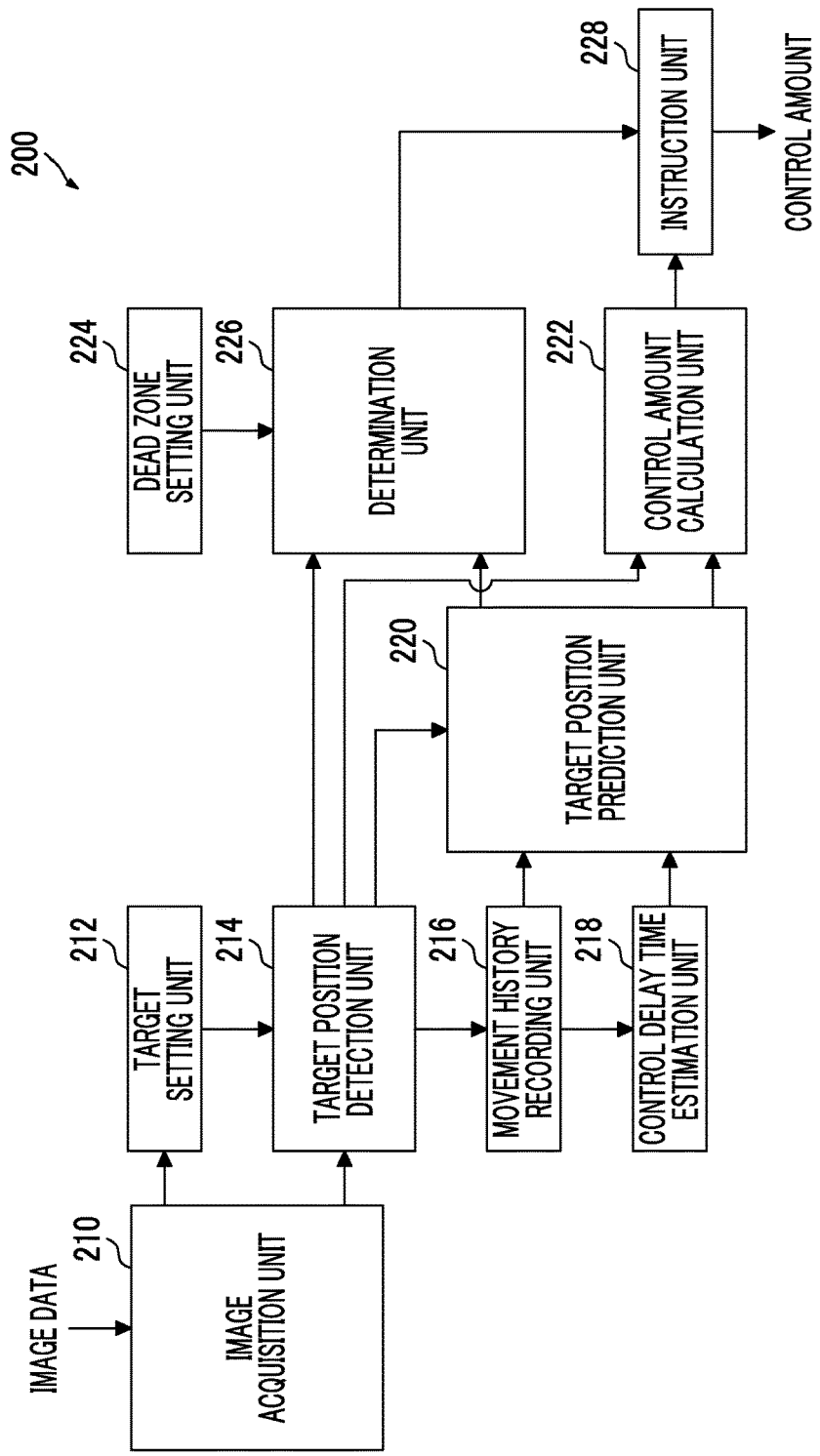
FIG. 4 is a block diagram illustrating a system configuration of a control terminal functioning as a tracking control device.

FIG. 4 is a block diagram illustrating a system configuration of a control terminal functioning as the tracking control device.

As illustrated in FIG. 4, the tracking control device 200 includes an image acquisition unit 210, a target setting unit 212, a target position detection unit 214, a movement history recording unit 216, a control delay time estimation unit 218, a target position prediction unit 220, a control amount calculation unit 222, a dead zone setting unit 224, a determination unit 226, and an instruction unit 228.

<Image Acquisition Unit>

The image acquisition unit 210 acquires images from the camera 10 communicatably connected thereto. When the camera 10 is instructed to execute imaging from the tracking control device 200, the camera 10 captures images at a constant frame rate. The camera 10 sequentially transfers the captured images to the control terminal 100. The image acquisition unit 210 sequentially acquires the images transferred from the camera 10.

<Target Setting Unit>

The target setting unit 212 sets a target, that is, a subject that is a tracking target. The target setting unit 212 displays an image captured by the camera 10 on the display 102 and sets a subject touched by the user on the screen, as the target.

Figure 5:
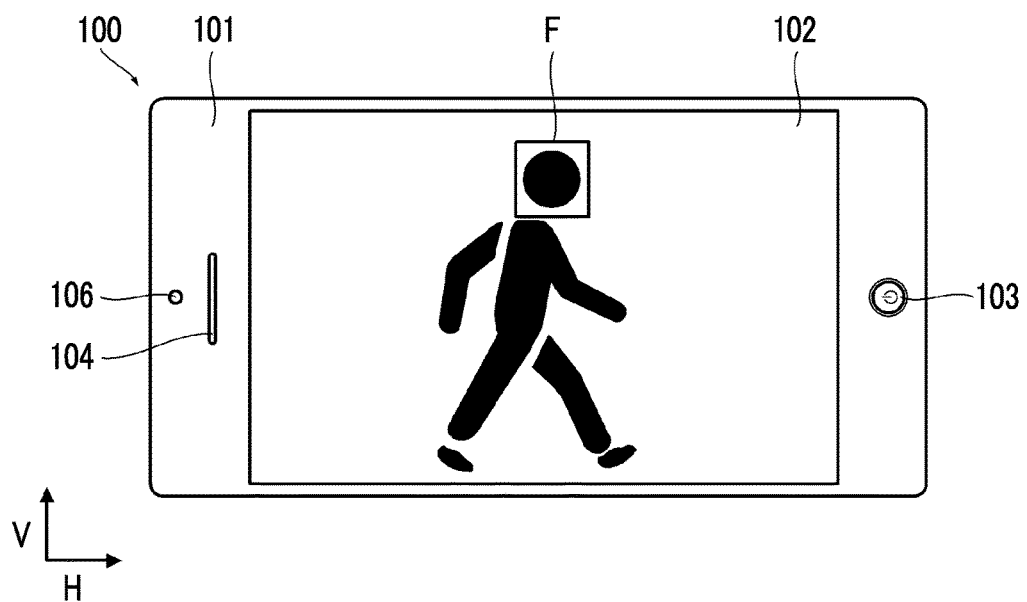
FIG. 5 is a diagram illustrating a screen display example of a display at the time of setting a target.

FIG. 5 is a diagram illustrating a screen display example of the display when the target is set.

As illustrated in FIG. 5, when the target is set, the image captured by the camera 10 is displayed on the display 102. The target setting unit 212 acquires image data from the camera 10 and causes the image data to be displayed on the display 102.

The user confirms a screen display of the display 102, and touches a subject that is the tracking target on the screen to select the subject. The target setting unit 212 sets a rectangular tracking frame F around a touch position on the basis of an output from the touch panel input unit 126, and sets the target. In this case, for example, in a case where a person is selected as a target, a face region of a person is extracted, and the tracking frame F is set to surround the extracted face region. Alternatively, the moving body is extracted with reference to the touched position, and the tracking frame F is set to surround the extracted moving body.

A center of the set tracking frame F is the position of the target. The set tracking frame F is superimposed on the captured image and displayed on the display 102.

<Target Position Detection Unit>

The target position detection unit 214 analyzes the image acquired by the image acquisition unit 210 and detects the position of the target that is a tracking target. In this embodiment, the position of the target is detected using known block matching using template. In the block matching, a motion vector of the target is obtained using a template among a plurality of pieces of image data obtained in time series, to obtain the position of the target. In this case, for example, the position of the target is obtained using the image in the set tracking frame as a template image.

[Movement History Recording Unit]

The movement history recording unit 216 records the movement history of the target on the basis of the information on the position of the target detected by the target position detection unit 214. Information on this movement history includes at least information on position of the target, and information on a time when the position has been detected. The information on this movement history is recorded, for example, in the main memory 114.

The information on the movement history is used for prediction of the position of the target. Therefore, a history required for at least prediction is recorded.

[Control Delay Time Estimation Unit]

The control delay time estimation unit 218 estimates the time T at which a control delay occurs on the basis of a state of communication between the camera 10 and the control terminal 100. That is, the control delay time estimation unit 218 estimates a degree of delay of control due to influence of the communication. In this embodiment, the control delay time estimation unit 218 detects a time required for transmission and reception of data to estimate the time T at which the control delay occurs. The time required for transmission and reception of data is detected, for example, on the basis of a reception interval of image data. That is, an interval at which the image data is received is measured, and the time required for transmission and reception of data is detected. In this case, it is possible to obtain an average of a reception interval of the most recent image data of N times and use the average as the time required for transmission and reception of data.

<Target Position Prediction Unit>

The target position prediction unit 220 predicts the position of the target after the T time on the basis of the movement history of the target. In this embodiment, the target position prediction unit 220 separately predicts a position in the pan direction after the T time and a position in the tilt direction after the T time.

Figure 6:
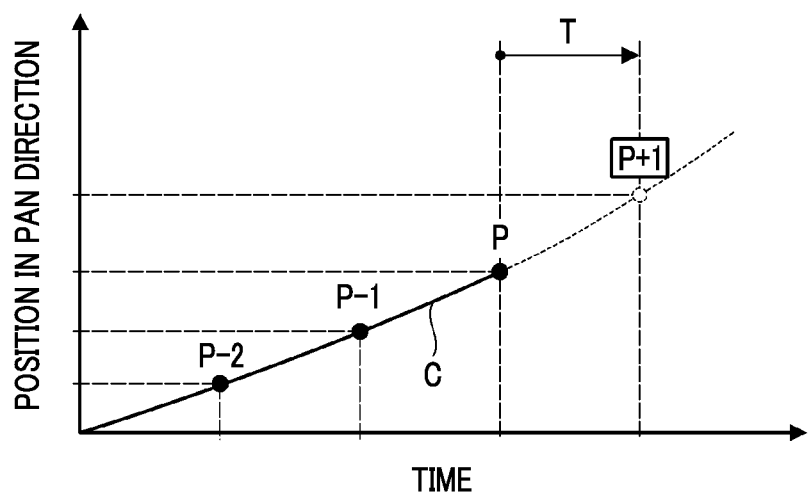
FIG. 6 is a diagram illustrating an example of a prediction method.

FIG. 6 is a diagram illustrating an example of a prediction method, and illustrates a method of predicting the position of the target in the pan direction after the T time.

As illustrated in FIG. 6, a motion of the target is estimated from the movement history of the target, and the position of the target after the T time is estimated.

In FIG. 6, a horizontal axis represents time, and a vertical axis represents the position of the target in the pan direction. Further, a point P is a currently detected position of the target, a point P−1 is a previously detected position of the target, and a point P−2 is a further previously detected position of the target. Further, a point P+1 is a position of the target after the T time that is currently predicted.

As illustrated in the FIG. 6, a curve C passing through respective points detected in the past through interpolation is obtained for the target that moves in one direction, and a position P+1 of the target after the time T is obtained.

Figure 7:
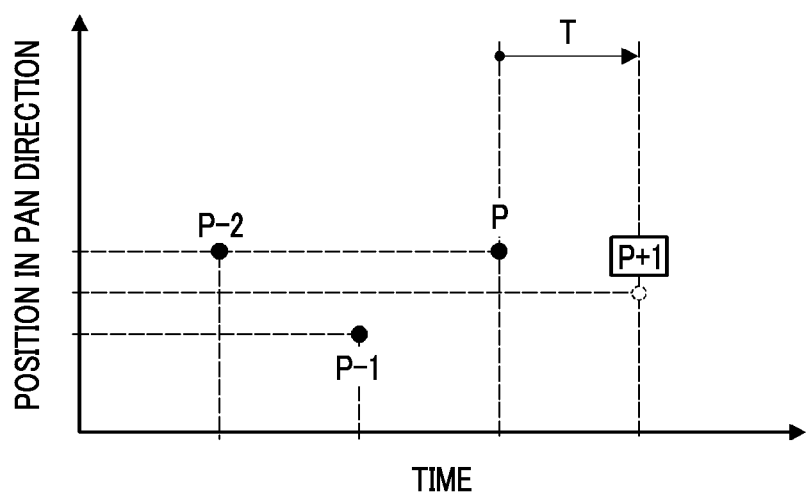
FIG. 7 is a diagram illustrating another example of a prediction method.

FIG. 7 is a diagram illustrating another example of the prediction method. FIG. 7 illustrates a method of predicting a position of the target in the pan direction after the T time, as in FIG. 6.

As illustrated in FIG. 7, an average of position detected in the past is obtained for the target that randomly moves, and the position P+1 of the target after the time T is obtained.

Thus, the target position prediction unit 220 analyzes the movement history of the target to predict the position of the target after the T time. The predicted position is output to the control amount calculation unit 222 as the target prediction position.

<Control Amount Calculation Unit>

The control amount calculation unit 222 calculates a pan and tilt control amount of the camera 10 required to track the target. In this case, the control amount calculation unit 222 calculates the pan and tilt control amount of the camera 10 on the basis of the target prediction position predicted by the target position prediction unit 220. That is, the control amount calculation unit 222 calculates the pan and tilt control amount of the camera 10 so that the target after the T time is located at a predetermined position within the imaging screen of the camera 10.

Figure 8:
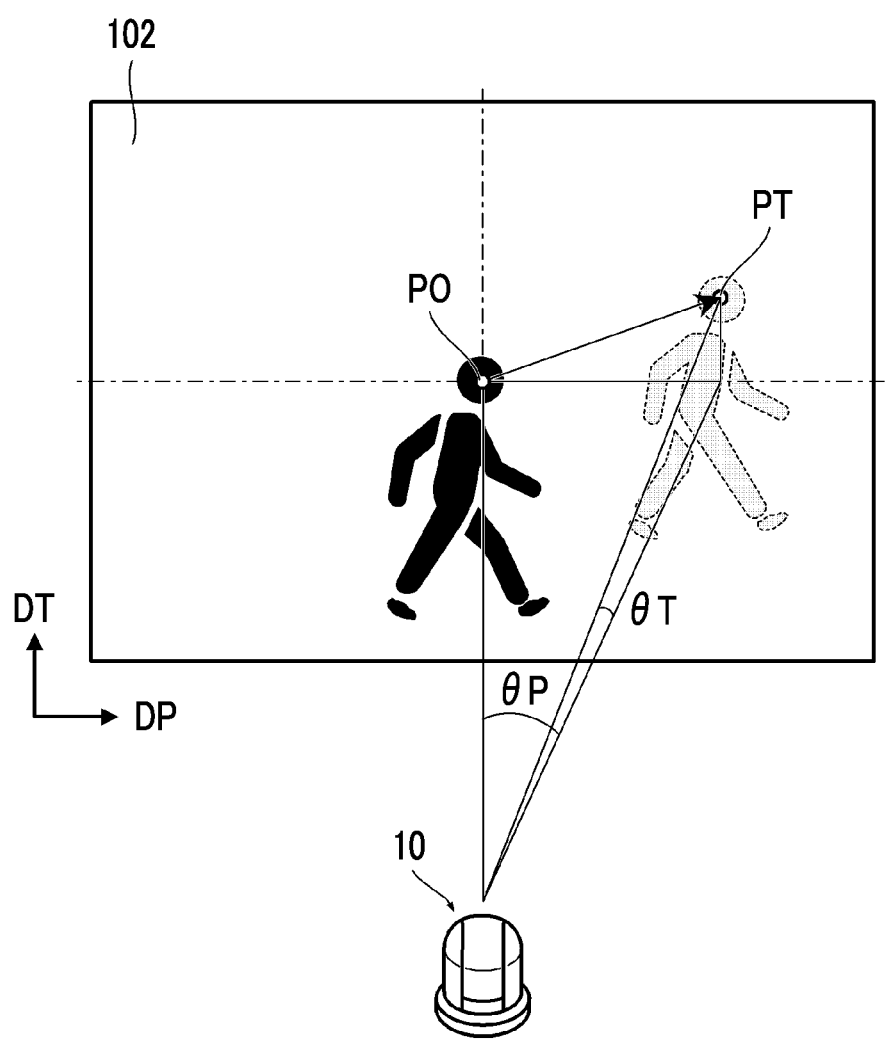
FIG. 8 is a conceptual diagram of a method of calculating a pan and tilt control amount.

FIG. 8 is a conceptual diagram of a method of calculating the pan and tilt control amount.

In tracking imaging, the pan and tilt of the camera 10 are controlled so that the target is always located at a predetermined position within the screen.

When a position at which the target is arranged within the imaging screen of the camera 10 is a target arrangement position PO, the control amount calculation unit 222 calculates the pan and tilt control amount of the camera 10 required to move the target arrangement position PO to the target prediction position PT. For example, in a case where the target arrangement position PO is set to a center of the screen, the control amount calculation unit 222 calculates the pan and tilt control amount of the camera 10 required to move the position of the center of the imaging screen of the camera 10 to the target prediction position PT.

For the control amount, an angle and a speed of rotation in the pan direction and the tilt direction are calculated, as illustrated in FIG. 8. That is, a rotation angle $\theta P$ and an angular velocity in the pan direction DP are calculated as the control amount in the pan direction DP, and a rotation angle θT and an angular velocity in the tilt direction DT are calculated as the control amount in the tilt direction DT.

In some cases, the information on the target prediction position cannot be acquired. In such cases, the control amount calculation unit 222 calculates the pan and tilt control amount of the camera 10 on the basis of the target position detected by the target position detection unit 214. The case where the information on the target prediction position cannot be acquired is, for example, a case where the information on the movement history of the target is not obtained and the position of the target after the T time cannot be predicted, as immediately after the start of tracking.

<Dead Zone Setting Unit>

The dead zone setting unit 224 sets the dead zone in the imaging screen of the camera 10 on the basis of the target arrangement position. The dead zone refers to a zone in which the tracking control is not performed. That is, the dead zone is a zone in which the camera 10 is not caused to be panned and tilted even when the target is moved. By setting the dead zone, it is possible to prevent the camera 10 from being panned and tilted with a small motion of the target and to capture a stable high-quality image.

Figure 9:
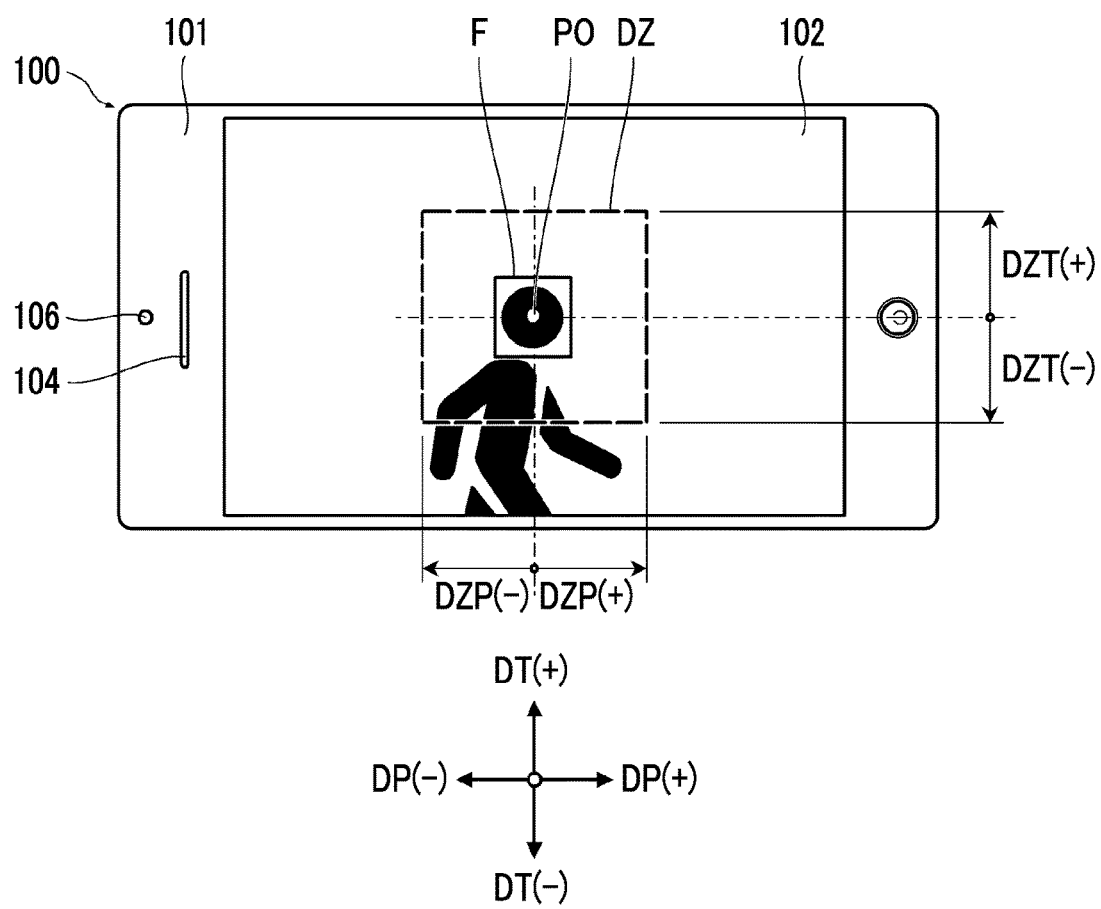
FIG. 9 is a conceptual diagram of setting of a dead zone.

FIG. 9 is a conceptual diagram of a setting of the dead zone.

As illustrated in FIG. 9, the dead zone DZ is set in a certain range within the imaging screen with reference to the target arrangement position PO. In the example illustrated in FIG. 9, the target arrangement position PO is set at a center of the imaging screen of the camera 10.

The dead zone DZ is set in a certain range in the pan direction DP and a certain range in the tilt direction DT with reference to the target arrangement position PO. More specifically, the dead zone DZ is set in a certain range DZP(+) in the positive pan direction DP(+) and a predetermined range DZP(−) in the negative pan direction DP(−) with reference to the target arrangement position PO. Further, the dead zone DZ is set in a certain range DZT(+) in the positive tilt direction DT(+) and a predetermined range DZT(−) in the negative tilt direction DT(−).

Setting information of the dead zone DZ is stored as dead zone setting information in the nonvolatile memory 116. The dead zone setting unit 224 reads the dead zone setting information and sets the dead zone DZ.

<Determination Unit>

The determination unit 226 acquires the information on the target prediction position predicted by the target position prediction unit 220 and determines whether or not the target prediction position belongs to the dead zone DZ. A result of the determination is output to the instruction unit 228.

In a case where the information on the target prediction position cannot be acquired, the determination unit 226 performs the determination on the basis of the target position detected by the target position detection unit 214. That is, the determination unit 226 determines whether or not the target position detected by the target position detection unit 214 belongs to the dead zone DZ.

<Instruction Unit>

The instruction unit 228 instructs the camera 10 to execute the pan and tilt on the basis of the determination result of the determination unit 226. Specifically, the instruction unit 228 instructs the camera 10 to execute the pan and tilt only when the target prediction position is determined not to belong to the dead zone. Therefore, in a case where the target prediction position is determined to belong to the dead zone, an instruction to execute the pan and tilt is not performed. As a result, the pan and tilt are performed only in a case where the target prediction position does not belong to the dead zone.

The instruction is performed by transmitting information on a pan and tilt control amount calculated by the control amount calculation unit 222 to the camera 10.

<<Tracking Control Method>>

Next, a tracking control method in the automatic tracking imaging system of this embodiment will be described.

First, a setting of the target is performed.

Figure 10:
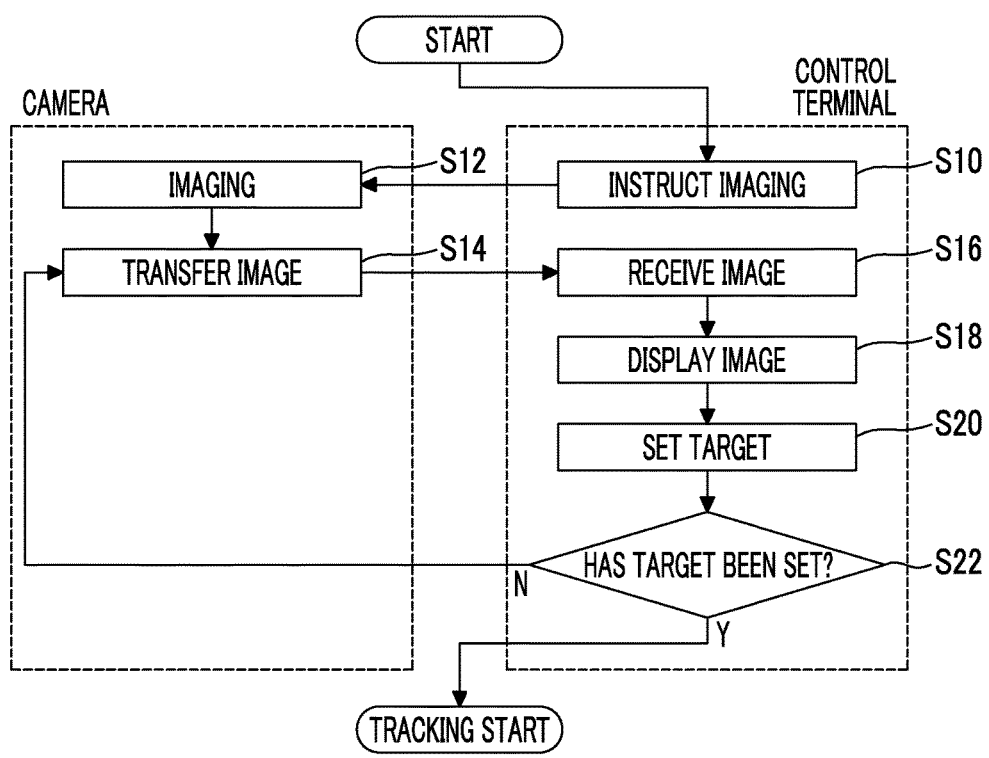
FIG. 10 is a flowchart illustrating a procedure of a target setting process.

FIG. 10 is a flowchart illustrating a procedure of a process of setting the target. In FIG. 10, a right block is a process that is performed by the control terminal 100, and a left block is a process that is performed by the camera 10.

First, imaging start is instructed from the control terminal 100 to the camera 10 (step S10). The camera 10 starts imaging in response to the imaging start instruction (step S12). The camera 10 transfers a captured image to the control terminal 100 (step S14).

The control terminal 100 receives the image transferred from the camera 10 (step S16), and displays the received image on the display 102 (step S18).

The user touches a subject serving as a target from the image displayed on the display 102 to set the target (step S20).

Then, it is determined whether or not the target setting has been completed (step S22), and when the target setting is completed, the tracking control is started.

Thus, the target setting is performed by causing the image captured by the camera 10 to be displayed on the display 102 of the control terminal 100 and causing the user to touch the subject serving as the target on the screen.

Figure 11:
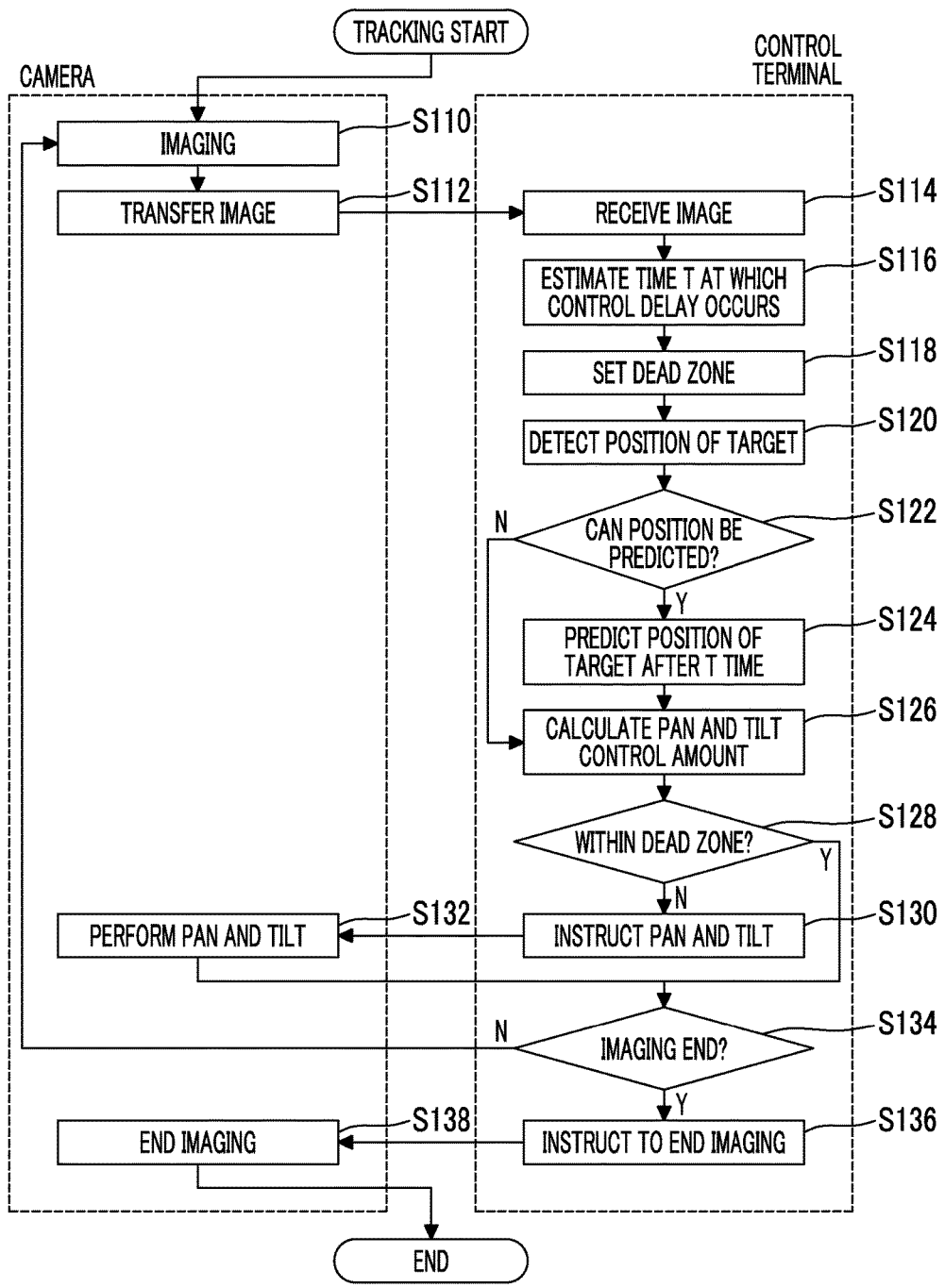
FIG. 11 is a flowchart illustrating a procedure of tracking control.

FIG. 11 is a flowchart illustrating a procedure of a tracking control.

image is taken at a later target of setting continue camera 10 (step S110). The captured image is transferred to the control terminal 100 (step S112).

The control terminal 100 receives an image transferred from the camera 10 (step S114). The control terminal 100 estimates the time T at which a control delay occurs from the communication state (step S116). That is, the control terminal 100 detects a time required for transmission and reception of data and estimates the time T at which the control delay occurs. Here, the time required for transmission and reception of data is detected on the basis of a reception interval of the image data. Therefore, for the estimation, it is necessary to receive the image at least twice.

If the time T at which the control delay occurs is estimated, then the control terminal 100 sets the dead zone (step S118). That is, the control terminal 100 sets the dead zone DZ in a certain range with reference to the target arrangement position PO (see FIG. 5).

If the dead zone DZ is set, then the control terminal 100 detects the position of the target from the image captured by the camera 10 (step S120). Information on the detected position of the target is stored in the main memory 114 as the target movement history together with information on a time at which the image is captured.

If the detection of the position of the target is completed, then the control terminal 100 determines whether or not a movement position of the target after the T time can be predicted (step S122). The prediction is performed on the basis of the movement history of the target. Therefore, in a case where the movement history is not acquired, the prediction is determined not to be possible.

If it is determined in step S122 that prediction of the movement position of the target after the T time is determined to be possible, the control terminal 100 predicts the position of the target after the T time on the basis of the movement history of the target (step S124). On the basis of a result of the prediction, the control terminal 100 calculates the pan and tilt control amount (step S126). That is, the control terminal 100 calculates the pan and tilt control amount of the camera 10 required to cause the target arrangement position to be located at the target prediction position.

When it is determined in step S122 that the prediction is not possible, the control terminal 100 calculates the pan and tilt control amount of the camera 10 required to cause the target to be located at the target arrangement position on the basis of the target position detected in step S120. That is, the control terminal 100 calculates the pan and tilt control amount of the camera 10 required to cause the target arrangement position to be located at the detected target position.

If the pan and tilt control amount is calculated, then the control terminal 100 determines whether or not the target prediction position belongs to the dead zone DZ (step S128). That is, the control terminal 100 determines whether or not the predicted position of the target after the T time belongs to the dead zone DZ.

In a case where the position of the target after the T time is not predictable, that is, in a case where the information on the target prediction position is not acquired, the control terminal 100 determines whether or not the position of the target detected in step S120 belongs to the dead zone DZ.

If the target prediction position is determined not to belong to the dead zone DZ as a result of this determination, the control terminal 100 instructs the camera 10 to execute the pan and tilt (step S130). That is, the control terminal 100 transmits information on the calculated control amount to the camera 10 and instructs the camera 10 to execute the pan and tilt using the calculated control amount.

When the camera 10 receives a command to execute the pan and tilt from the control terminal 100, the camera 10 performs the pan and tilt according to the instruction (step S132). That is, the camera 10 performs the pan and tilt at the indicated control amount. Thus, the camera 10 is panned and tilted so that the moving target is located at the target arrangement position.

On the other hand, when the target prediction position is determined to belong to the dead zone DZ in step S128, the control terminal 100 does not instruct the camera 10 to execute the pan and tilt, proceeds to the next process. Accordingly, it is possible to prevent the camera 10 from following a small motion of the target.

Then, the control terminal 100 determines whether or not imaging end is instructed (step S134). In a case where the imaging end is instructed, the control terminal 100 instructs the camera 10 to end the imaging (step S136). The camera 10 receives the imaging end instruction and ends the imaging (step S138).

If the imaging end is not instructed, the process returns to step S110, and the process is repeatedly performed.

Thus, in the automatic tracking imaging system 1 of this embodiment, the position of the target is predicted in consideration of the control delay due to communication, and the pan and tilt of the camera 10 are controlled on the basis of the predicted position of the target. Accordingly, even in a case where the control delay occurs due to the communication, it is possible to cause the camera to accurately follow the target.

Further, in the automatic tracking imaging system 1 of this embodiment, the dead zone DZ is set, and the camera 10 is panned and tilted only in a case where the target is predicted to move out of the dead zone DZ. Accordingly, it is possible to effectively prevent the camera 10 from following the small motion of the target and capture a high-quality moving image.

Figure 12A:
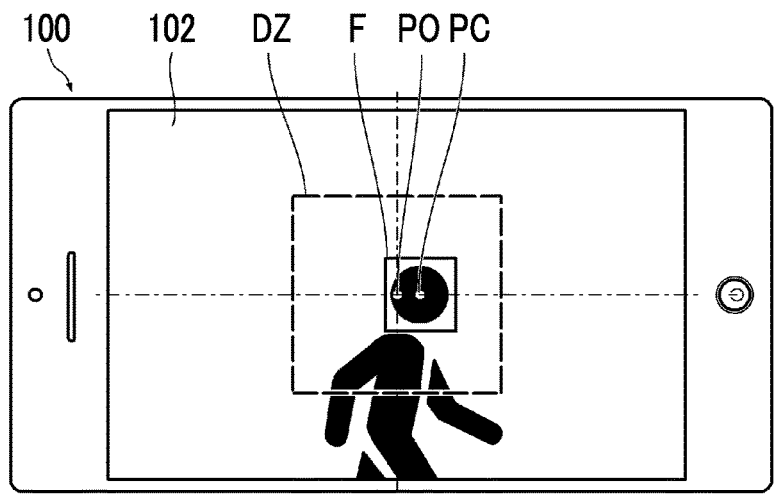
FIGS. 12A to 12C are conceptual diagrams of tracking control according to this embodiment.
Figure 12B:
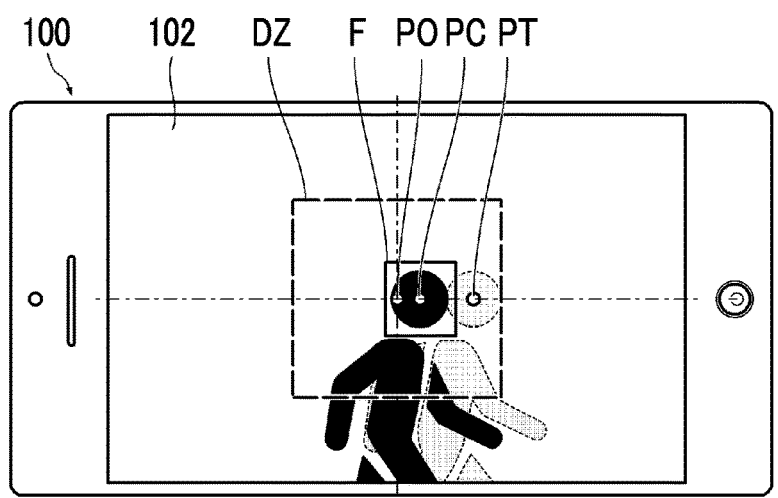
Figure 12C:
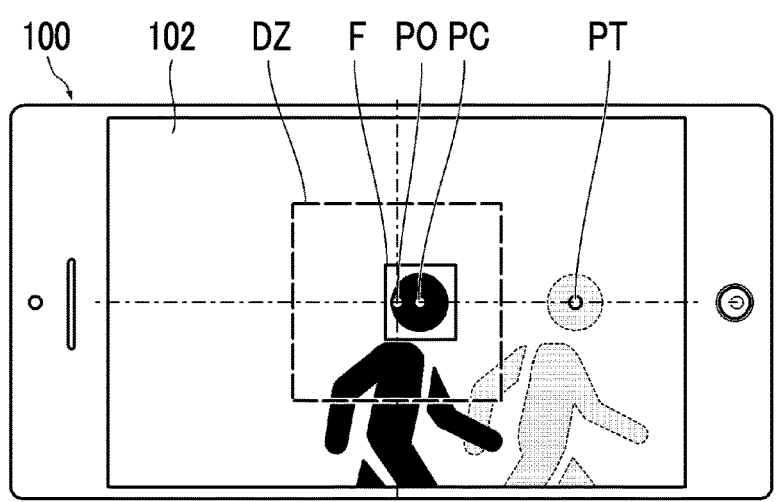

FIGS. 12A to 12C are conceptual diagrams of tracking control of this embodiment. In FIGS. 12A to 12C, reference sign DZ indicates a dead zone, reference sign F indicates a tracking frame, reference sign PO indicates a target arrangement position, reference sign PC indicates a position of the target detected from the image, and reference sign PT indicates a target prediction position.

FIG. 12A illustrates a case where the position of the target cannot be predicted after a T time. In this case, the camera 10 is panned and tilted on the basis of the position PC of the target detected from the image. That is, the camera 10 is panned and tilted so that the target arrangement position PO is moved to the position of the target PC detected from the image.

In the case of FIG. 12A, since the detected position PC of the target belongs to the dead zone DZ, the camera 10 is not panned and tilted.

FIG. 12B illustrates a case where the position of the target can be predicted after the T time, and a case where the target prediction position PT belongs to the dead zone DZ. In this case, the camera 10 is not panned and tilted.

FIG. 12C illustrates a case where the position of the target can be predicted after the T time, and a case where the target prediction position PT does not belong to the dead zone DZ. In this case, the camera 10 is panned and tilted on the basis of the target prediction position PT. That is, the camera 10 is panned and tilted so that the target arrangement position PO is moved to the target prediction position PT.

<<Second Embodiment of Tracking Control>>

In the present invention, the tracking control is performed by predicting the operation of the target. However, when the tracking control is performed by predicting the operation of the target in this manner, the target may be lost or a large pan and tilt operation may be required at the time of next control in a case where an error between the predicted position and the actual position is great.

Therefore, in this embodiment, by limiting the amount of control of the pan and the tilt to a certain value, it is possible to stably capture a high-quality moving image even when the error between the predicted position and the actual position enable is great.

Figure 13:
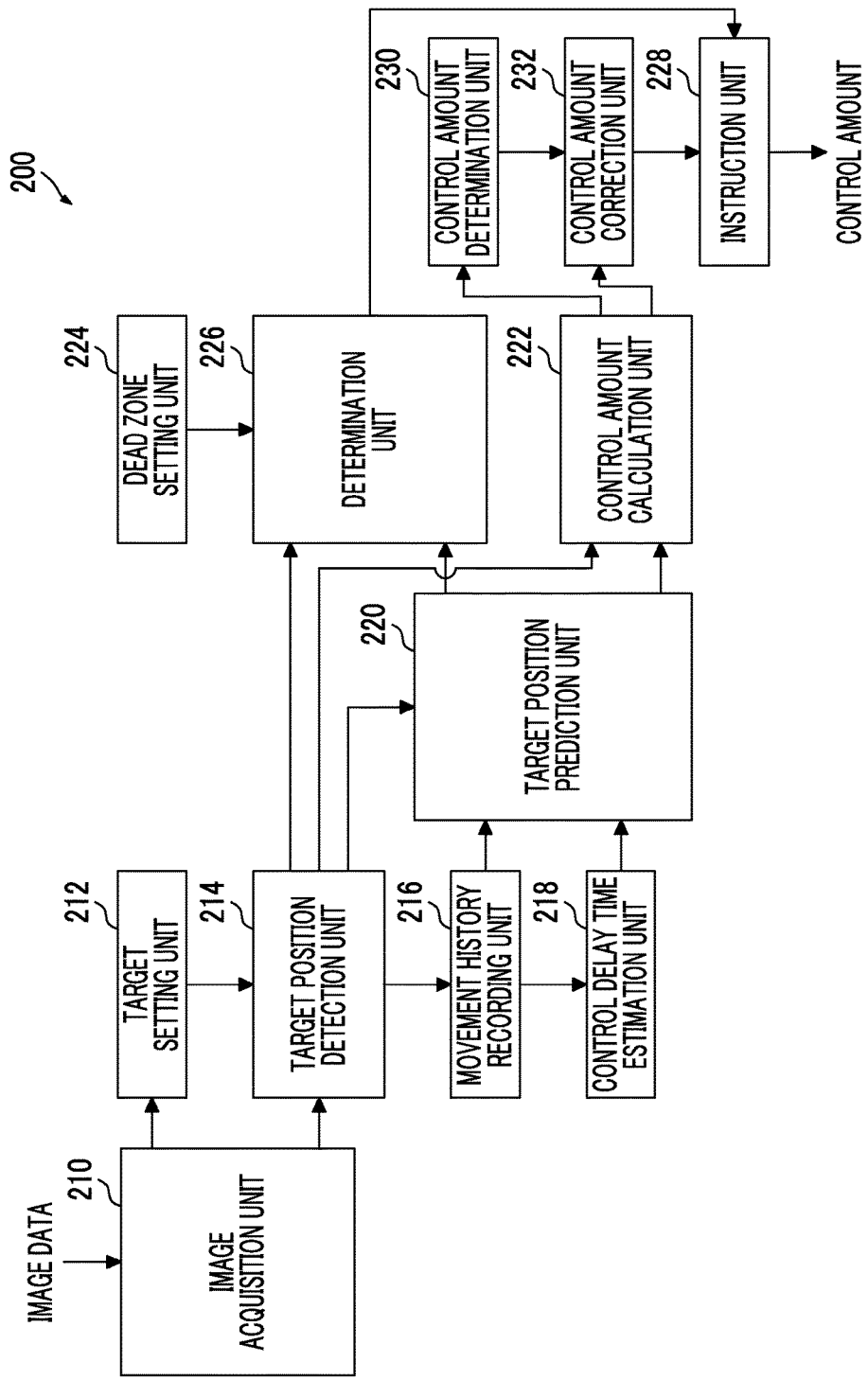
FIG. 13 is a block diagram illustrating a system configuration of a control terminal functioning as a tracking control device of a second embodiment.

FIG. 13 is a block diagram illustrating a system configuration of the control terminal functioning as the tracking control device of the second embodiment.

The tracking control device of this embodiment includes a control amount determination unit 230 and a control amount correction unit 232. The tracking control device of this embodiment has the same configuration as the configuration of the tracking control device in the above embodiment except that control amount determination unit 230 and the control amount correction unit 232 are included. Therefore, the same components as those of the tracking control device in the above embodiment are denoted by the same reference signs, and description thereof will be omitted.

The control amount determination unit 230 compares a control amount calculated by the control amount calculation unit 222 with a threshold value and determines whether or not the calculated control amount is equal to or more than a threshold value.

The threshold value is set to, for example, the same value as the set value of the dead zone DZ, and is set for each in the pan direction and the tilt direction.

Figure 14:
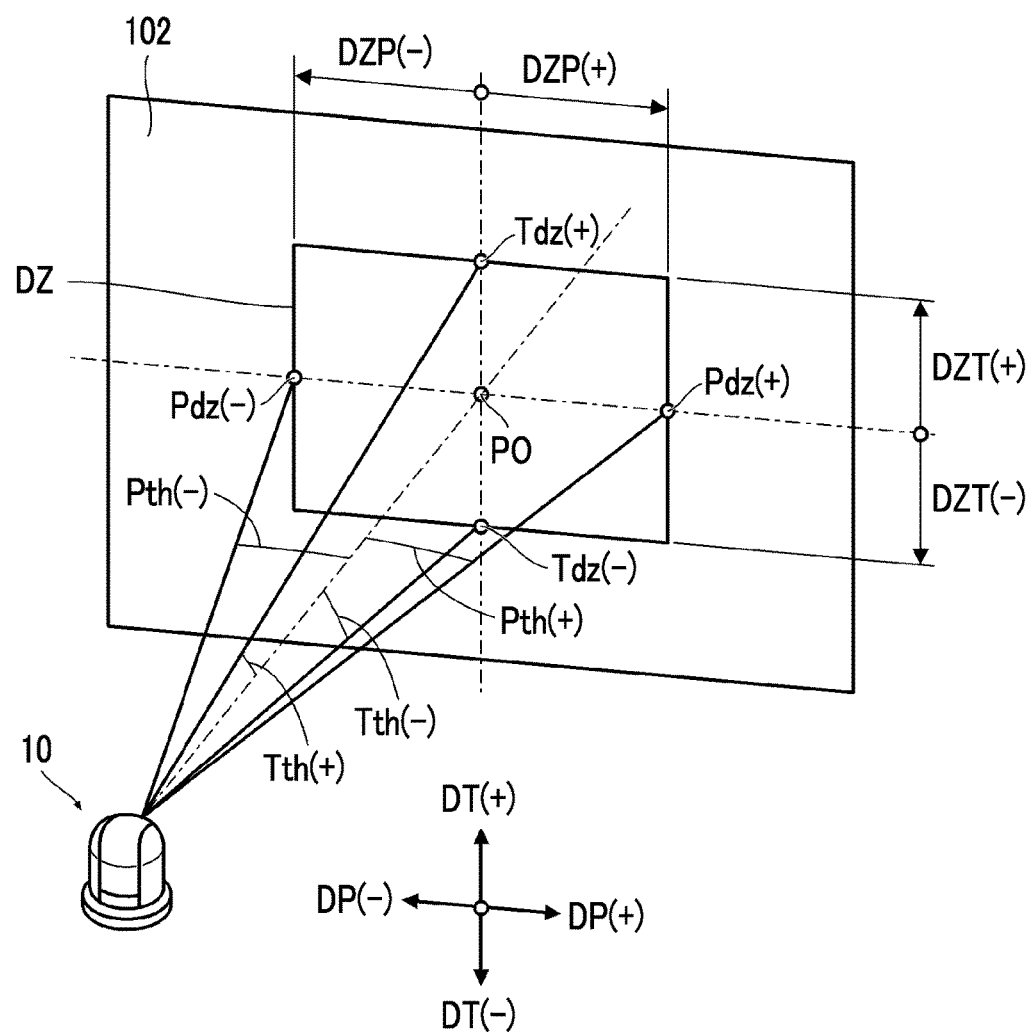
FIG. 14 is a conceptual diagram illustrating setting of a threshold value.

FIG. 14 is a conceptual diagram of setting of a threshold value.

In FIG. 14, a point Pdz(+) is a boundary position of the positive pan direction DP(+) of the dead zone DZ set with reference to the target arrangement position PO, and a point Pdz(−) is a boundary position in the negative pan direction DP(−). Further, a point Tdz(+) is a boundary position of the positive tilt direction DT(+), and a point Tdz(−) is a boundary position in the negative tilt direction DT(−).

As illustrated in FIG. 14, a threshold value Pth(+) for the positive pan direction DP(+) is set as a rotation angle required to move the target arrangement position PO to the point Pdz(+), that is, the boundary position in the positive pan direction DP(+) of the dead zone DZ, and a threshold value Pth(−) for the negative pan direction DP(−) is set as a rotation angle required to move the target arrangement position PO to the point Pdz(−), that is, the boundary position Pdz(−) in the negative pan direction DP(−). Further, a threshold value Tth(+) for the positive tilt direction DT(+) is set as a rotation angle required to move the target arrangement position PO to the point Tdz(+), that is, the boundary position in the positive tilt direction DT(+) of the dead zone DZ, and a threshold value Tth(−) for the negative tilt direction DT(−) is set as a rotation angle required to move the target arrangement position PO to the point Tdz(−), that is, the boundary position Tdz(−) in the negative tilt direction DT(−).

The threshold value need not be exactly the same as the set value of the dead zone DZ, and can be set in a range which can be regarded as being the same. That is, the "same" includes a range that can be regarded as being substantially the same.

The control amount correction unit 232 corrects the control amount calculated by the control amount calculation unit 222 on the basis of the determination result of the control amount determination unit 230. That is, in a case where the control amount calculated by the control amount calculation unit 222 is equal to or larger than the threshold value, the control amount correction unit 232 corrects the control amount to the threshold value. The control amount correction unit 232 outputs information on the corrected control amount to the instruction unit 228.

In a case where the control amount calculated by the control amount calculation unit 222 is smaller than the threshold value, the control amount is output to the instruction unit 228 without being corrected.

Figure 15:
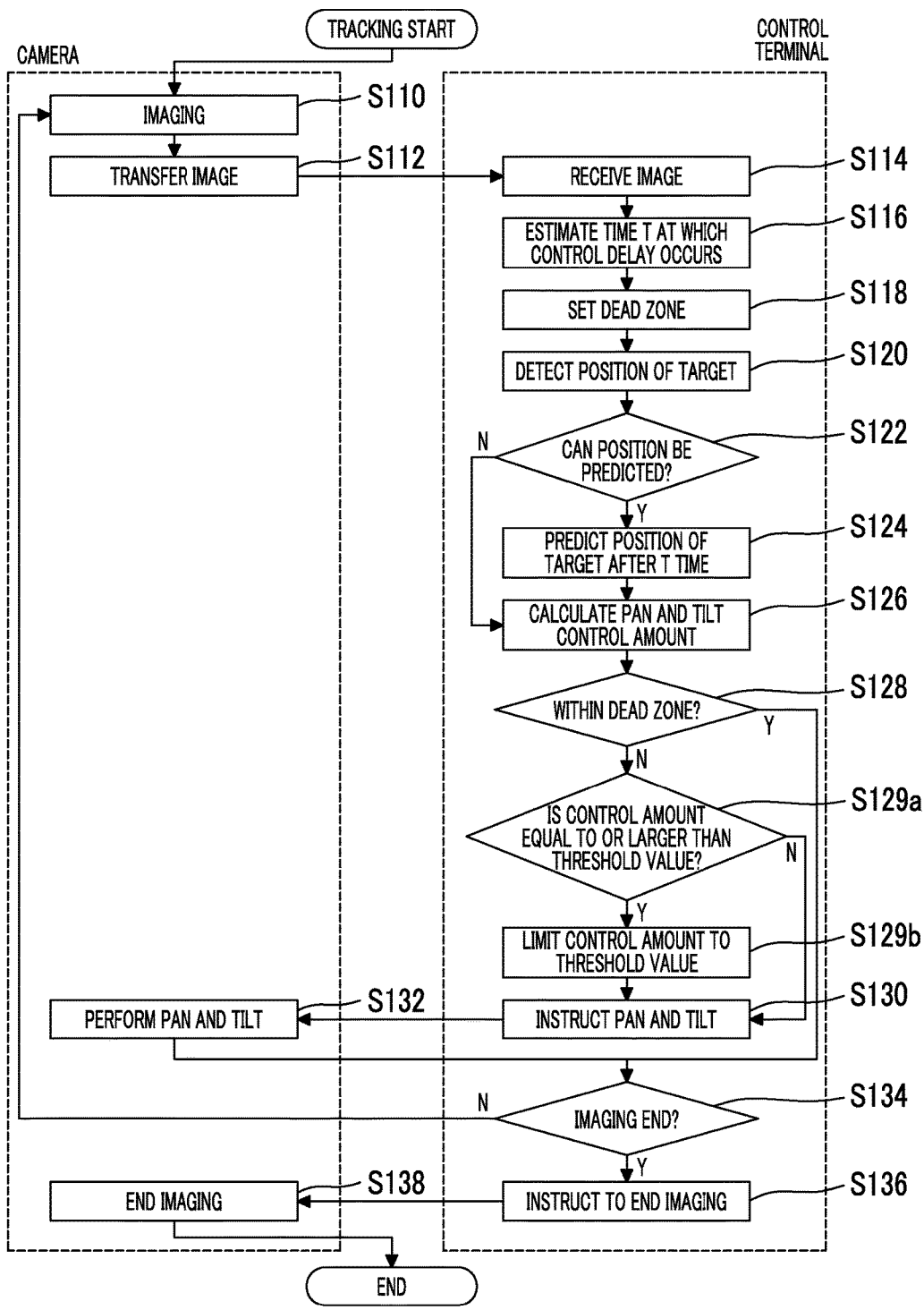
FIG. 15 is a flowchart illustrating a procedure of tracking control according to a second embodiment.

FIG. 15 is a flowchart illustrating a procedure of tracking control of the second embodiment.

The procedure is the same as the procedure of tracking control in the above-described embodiment except that a process of limiting the control amount is added. Thus, only the process of limiting the control amount will be described herein.

As illustrated in FIG. 15, when it is determined in step S128 that the target prediction position does not belong to the dead zone DZ, it is determined whether or not the calculated control amount is equal to or larger than the threshold value (step S129*a*).

Here, in a case where the calculated control amount is smaller than the threshold value, the camera 10 is instructed to be panned and tilted with the calculated control amount (step S130).

On the other hand, in a case where the calculated control amount is equal to or larger than the threshold value, the control amount is limited to the threshold value. That is, the control amount is corrected to be the threshold value (step S129*b*). The camera 10 is instructed to be panned and tilted with the corrected control amount (step S130). That is, the threshold value is set as the control amount, and the pan and tilt is instructed.

Thus, according to this embodiment, a rotation amount of the pan and tilt that can be executed in one control is limited to a certain value. Thus, even when the error is greater between the predicted position and the actual position, it is possible to prevent the target from being lost or the camera from being greatly panned and tilted. It is possible to stably capture a high-quality moving image.

Although the threshold value has been set according to a size of the dead zone in this embodiment, the threshold value may be able to be arbitrarily set by the user.

<<Third Embodiment of Tracking Control>>

In the above embodiment, the tracking control is performed by setting the constant dead zone. In this embodiment, the dead zone is increased or decreased according to a state of the target.

FIG. 16 is a block diagram illustrating a system configuration of a control terminal functioning as the tracking control device of the third embodiment.

The tracking control device of this embodiment is different from the tracking control device of the second embodiment in that a dead zone changing unit 234 is included. Therefore, the dead zone changing unit 234 will be described herein, other configurations are denoted by the same reference signs as those of the tracking control device of the second embodiment, and description thereof will be omitted.

The dead zone changing unit 234 increases or decreases a range of the dead zone set by the dead zone setting unit 224 according to a state of the target. In this embodiment, the dead zone is increased or decreased according to the movement direction of the target to be predicted. Specifically, the dead zone in the movement direction of the target to be predicted is decreased.

The dead zone changing unit 234 acquires information on the position of the target detected by the target position detection unit 214, and information on the target prediction position predicted by the target position prediction unit 220, and estimates the movement direction of the target. The dead zone is decreased in the estimated movement direction.

Figure 17A:
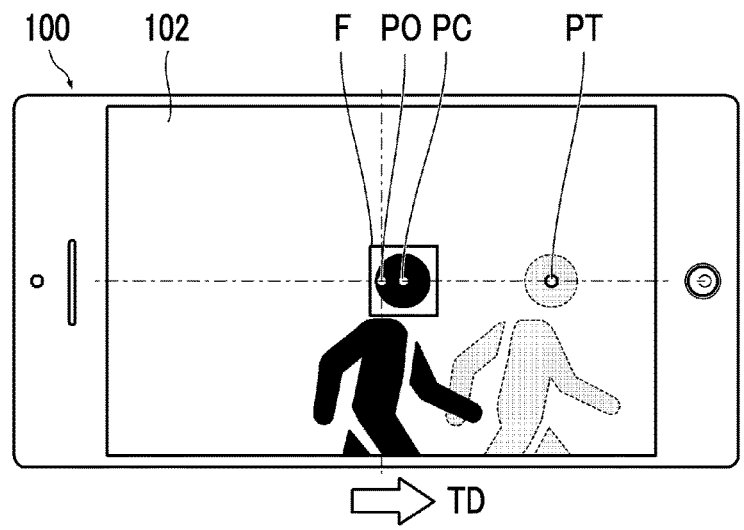
FIGS. 17A and 17B are conceptual diagrams of a method of changing a dead zone.
Figure 17B:
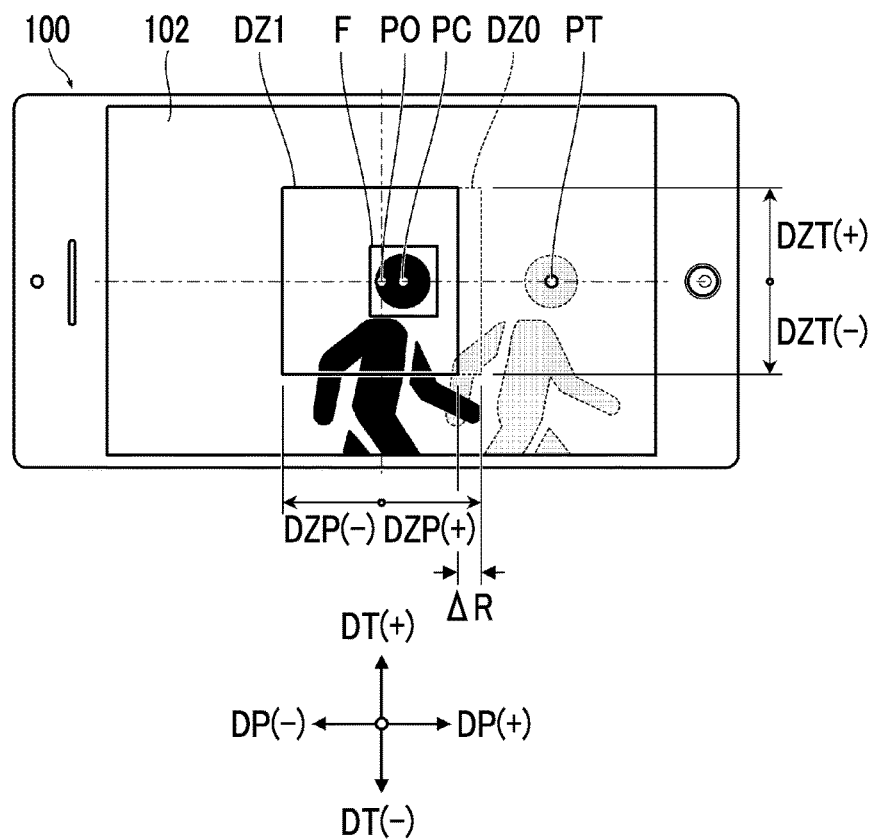

FIGS. 17A and 17B are conceptual diagrams of a method of changing the dead zone. FIG. 17A is a conceptual diagram of a method of predicting the movement direction of the target, and FIG. 17B is a conceptual diagram of a method of changing the dead zone on the basis of the prediction. Further, in FIGS. 17A and 17B, reference sign DZ0 indicates a dead zone before correction, reference sign DZ1 is a dead zone after correction, reference sign F is a tracking frame, reference sign PO is the target arrangement position, reference sign PC is the position of the target detected from the image, and reference sign PT is the target prediction position.

As illustrated in FIG. 17A, in a case where the target prediction position PT is in the positive pan direction DP(+) relative to the position PC of the target detected from the image, a movement direction TD of the target can be predicted to be in the positive pan direction DP(+).

In this case, as illustrated in FIG. 17B, in a case where the dead zone in the positive pan direction DP(+) is decreased by a predetermined amount. For example, a dead zone DZ0 before correction that is a reference dead zone is set in a range of DZP(+) in the positive pan direction DP(+) and a range of DZP(−) in the negative pan direction DP(−) with reference to the target arrangement position PO, and is set in a range of DZT(+) in the positive tilt direction DT(+) and a range of DZT(−) in the negative tilt direction DT(−), the dead zone in the positive pan direction DP(+) as the dead zone DZ1 after correction is set in a range of [DZP(+)−ΔR] with reference to the target arrangement position PO when the amount of correction is ΔR.

Thus, by narrowing the dead zone in a direction in which the target is predicted to move, the target can be appropriately tracked according to the motion of the target.

FIG. 18 is a flowchart illustrating a procedure of tracking control of the third embodiment.

The procedure is the same as the procedure of tracking control in the second embodiment except that a process of correcting the dead zone is added. Therefore, only the process of correcting the dead zone will be described herein.

As illustrated in FIG. 18, if the pan and tilt control amount is calculated in step S126, the control terminal 100 performs the process of correcting the dead zone (step S127). That is, information on the detected position of the target and information on the target prediction position are acquired and a movement direction of the target is estimated. The dead zone is corrected so that the dead zone in the estimated movement direction is decreased.

If the dead zone is corrected, it is determined whether or not, under the corrected dead zone, the target prediction position belongs to the dead zone (step S128).

Thus, according to this embodiment, the dead zone is corrected according to the movement direction of the target to be predicted. Thus, it is possible to appropriately prevent the image from shaking little by little while improving following performance.

Although the correction amount is constant in the above example, the correction amount may be increased or decreased, for example, according to the pan and tilt control amount. For example, the correction amount may be increased or decreased in proportion to the pan and tilt control amount.

<Modification Example of a Method of Correcting Dead Zone>

In the above embodiment, the case where the dead zone is increased or decreased according to the movement direction of the target to be predicted has been described by way of example, but an aspect of correcting the dead zone is not limited thereto. Hereinafter, a modification example of the method of correcting the dead zone will be described.

<Method of Increasing or Decreasing Dead Zone According to Speed of Target>

The dead zone can be increased or decreased according to a movement speed of the target. In this case, the dead zone is decreased when the speed of the target is higher. A decreasing aspect may be continuous or may be stepwise. Further, the entire dead zone may also be increased or decreased or only the dead zone in the movement direction may be increased or decreased. The movement speed of the target is obtained, for example, by acquiring information on the movement history of the target.

<Method of increasing or decreasing dead zone according to acceleration of target>

The dead zone can be increased or decreased according to an acceleration of the target. In this case, the dead zone is decreased when the acceleration of the target is higher. A decreasing aspect may be continuous or may be stepwise. Further, the entire dead zone may also be increased or decreased or only the dead zone in the movement direction may be increased or decreased. The acceleration of the target is obtained, for example, by acquiring the information on the movement history of the target.

<Method of Increasing or Decreasing Dead Zone According to Distance up to Target>

The dead zone can be increased or decreased according to a distance from the camera 10 to a distance up to the target.

Figure 19A:
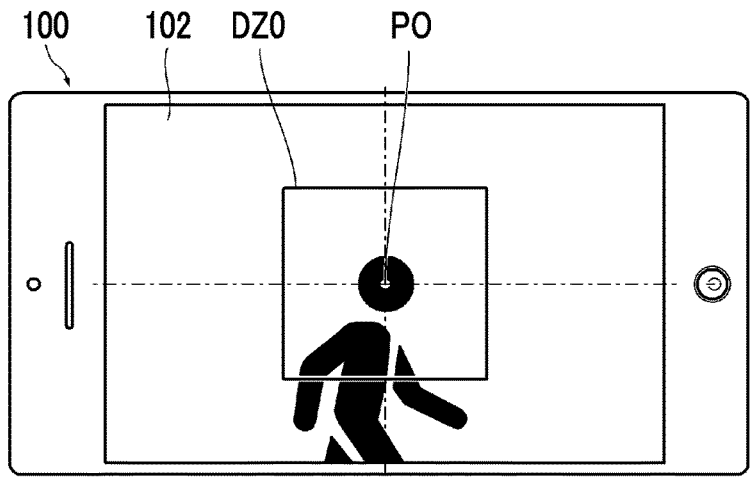
FIGS. 19A to 19C are conceptual diagrams of a method of increasing or decreasing a dead zone according to a distance up to a target.
Figure 19B:
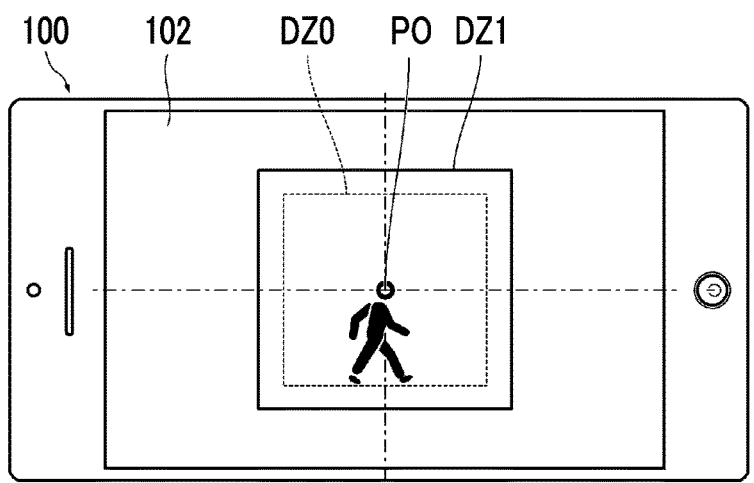
Figure 19C:
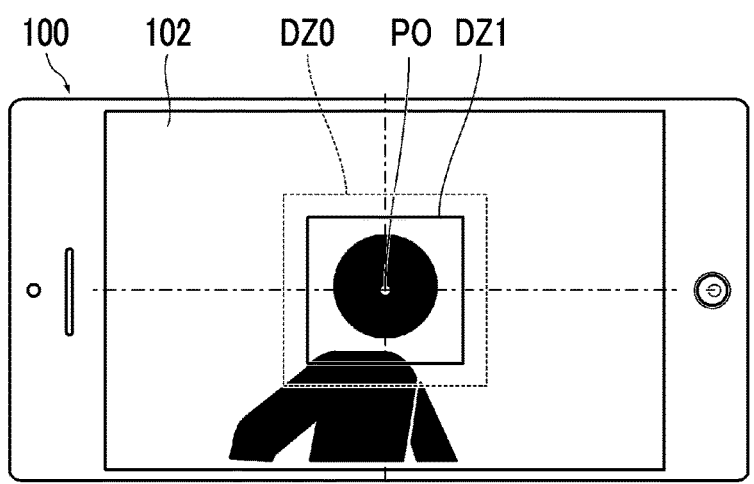

FIGS. 19A to 19C are conceptual diagrams of a method of increasing or decreasing the dead zone according to the distance up to the target. FIG. 19A illustrates a setting state of the dead zone at a distance serving as a reference. Further, FIG. 19B illustrates a setting state of the dead zone in a case where the target is far relative to the distance serving as a reference, and FIG. 19C illustrates a setting state of the dead zone in a case where the target is close relative to the distance serving as a reference.

As illustrated in FIG. 19A, the dead zone at the distance serving as a reference is assumed to be DZ0. If the dead zone after correction is DZ1, the dead zone DZ1 after correction is larger than the dead zone DZ0 at the distance serving as a reference when the distance up to the target is great, as illustrated in FIG. 19B. On the other hand, when the distance up to the target is small, the dead zone DZ1 after correction is smaller than the dead zone DZ0 at the distance serving as a reference, as illustrated in FIG. 19B.

Thus, when the dead zone is corrected according to the distance up to the target, the dead zone is decreased when the distance is shorter, and the dead zone is increased when the distance up to the target is greater. Accordingly, it is possible to appropriately prevent an image to be captured from shaking little by little.

An increasing or decreasing aspect may be a continuous or may be stepwise. Further, the distance up to the target can be obtained, for example, by acquiring distance measurement information at the time of auto-focus from the camera 10. Further, a distance measurement unit may be included in the camera 10 and the distance up to the target may be acquired from the distance measurement unit. Further, the distance up to the target may be obtained by analyzing the image captured by the camera 10.

<Method of Increasing or Decreasing Dead Zone According to Size of Target on Imaging Screen>

The distance from the camera 10 to the target may be estimated to some extent from the size of the target imaged by the camera 10. That is, if the imaging conditions are the same, the size of the target imaged by the camera 10 increases when the distance from the camera 10 to the target is shorter. Therefore, the dead zone can be increased or decreased according to the size of the imaged target, as in the case where the dead zone is increased or decreased according to the distance from the camera 10 to the target. In this case, the dead zone is decreased as the size of the target increases. That is, since the target is considered to be closer to the camera 10 as the target is captured to be larger, the dead zone is decreased as the size of the target increases.

For example, in a case where a person is selected as the target and a position of a face of the person is detected to perform tracking, the dead zone can be increased or decreased in comparison to a size of the face serving as the reference.

<Method of Increasing or Decreasing Dead Zone According to Orientation of Face of Person]

In a case where a person is a target, the dead zone can be increased or decreased according to an orientation of a face of a person on an imaging screen. This is because the person can be estimated to move in the direction of an orientation of the face. Therefore, in this case, the dead zone is decreased in the direction of orientation of the face of the person.

FIG. 20 is a conceptual diagram of a method of increasing or decreasing the dead zone according to an orientation of a face of a person which is a target.

As illustrated in FIG. 20, in a case where an orientation FD of the face of the person who is a target is a positive pan direction DP(+), the dead zone in the positive pan direction DP(+) is decreased by a predetermined amount. For example, a dead zone DZ0 before correction that is a reference dead zone is set in a range of DZP(+) in the positive pan direction DP(+) and a range of DZP(−) in the negative direction DP(−) with reference to the target arrangement position PO, and is set in a range of DZT(+) in the positive tilt direction DP(+) and a range of DZT(−) in the negative direction DP(−), the dead zone in the positive pan direction DP(+) as the dead zone DZ1 after correction is set in a range of [DZP(+)−ΔR] with reference to the target arrangement position PO when the amount of correction is ΔR.

An orientation of a face of a person is detected by analyzing the image captured by the camera 10. Therefore, as in this example, means for detecting a face of the person and an orientation thereof in a case where the dead zone is corrected according to the orientation of the face, that is, a face detection unit and an orientation detection unit are included in the control terminal 100. These means can be realized by a predetermined image analysis program.

<Method of Combining Plurality of Methods to Increase or Decrease Dead Zone>

Correction of the dead zone can be performed by combining a plurality of methods above. For example, the dead zone can be corrected according to the movement direction and a speed of the target to be predicted. Alternatively, the dead zone may be corrected according to the movement direction and an acceleration of the target to be predicted. Alternatively, the dead zone may be corrected according to the movement direction of the target to be predicted and a distance up to the target.

Thus, it is possible to increase or decrease the dead zone by combining various aspects. Accordingly, the dead zone can be set more appropriately and following performance can be improved.

<Fourth Embodiment of Tracking Control>

In this embodiment, the dead zone is increased or decreased according to a degree of reliability of the prediction. That is, when the degree of reliability of the prediction is low, the dead zone is increased to prevent small shaking of the image.

Figure 21:
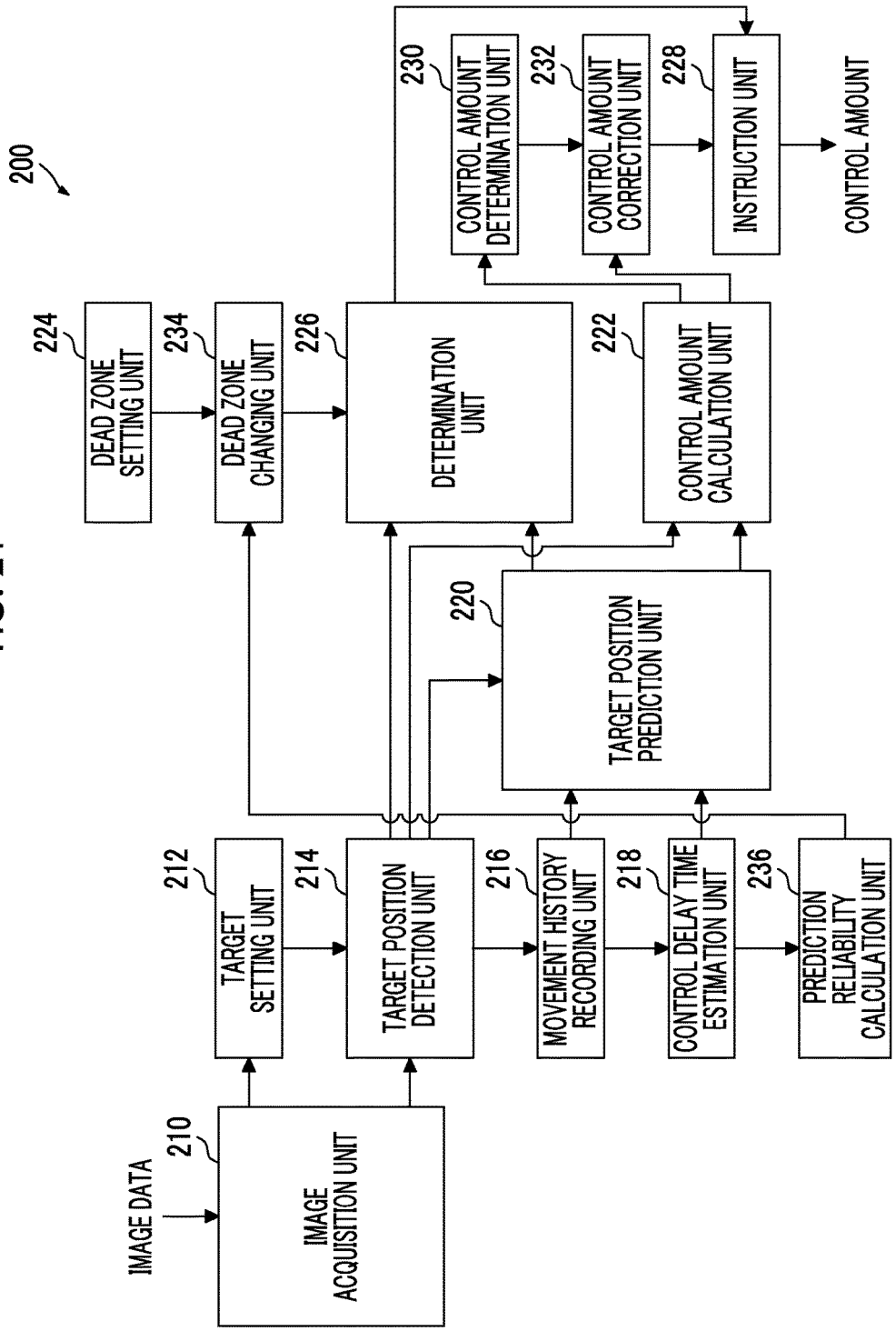
FIG. 21 is a block diagram illustrating a system configuration of a control terminal functioning as a tracking control device of a fourth embodiment.

FIG. 21 is a block diagram illustrating a system configuration of a control terminal functioning as the tracking control device of the fourth embodiment.

The tracking control device of this embodiment is different from the tracking control device of the second embodiment in that a predictiton reliability calculation unit 236 and a dead zone changing unit 234 are included. Therefore, only the prediction degree of reliability calculation unit 236 and the dead zone changing unit 234 will be described herein, other configurations are denoted by the same reference signs as those of the tracking control device of the second embodiment, and description thereof will be omitted.

The prediction degree of reliability calculation unit 236 calculates the degree of reliability of prediction, that is, a degree of reliability of the target prediction position predicted by the target position prediction unit 220 on the basis of the control delay time estimated by the control delay time estimation unit 218.

Generally, the degree of reliability of the prediction decreases when a prediction time is longer. Therefore, the degree of reliability calculated by the prediction degree of reliability calculation unit 236 decreases when the control delay time becomes longer.

The prediction degree of reliability calculation unit 236 refers to a table in which the control delay time and the degree of reliability are associated to calculate the degree of reliability of the prediction from the control delay time.

The dead zone changing unit 234 corrects the dead zone according to the calculated degree of reliability. Specifically, when the degree of reliability of the prediction is lower, the entire dead zone serving as a reference is corrected to increase.

Figure 22:
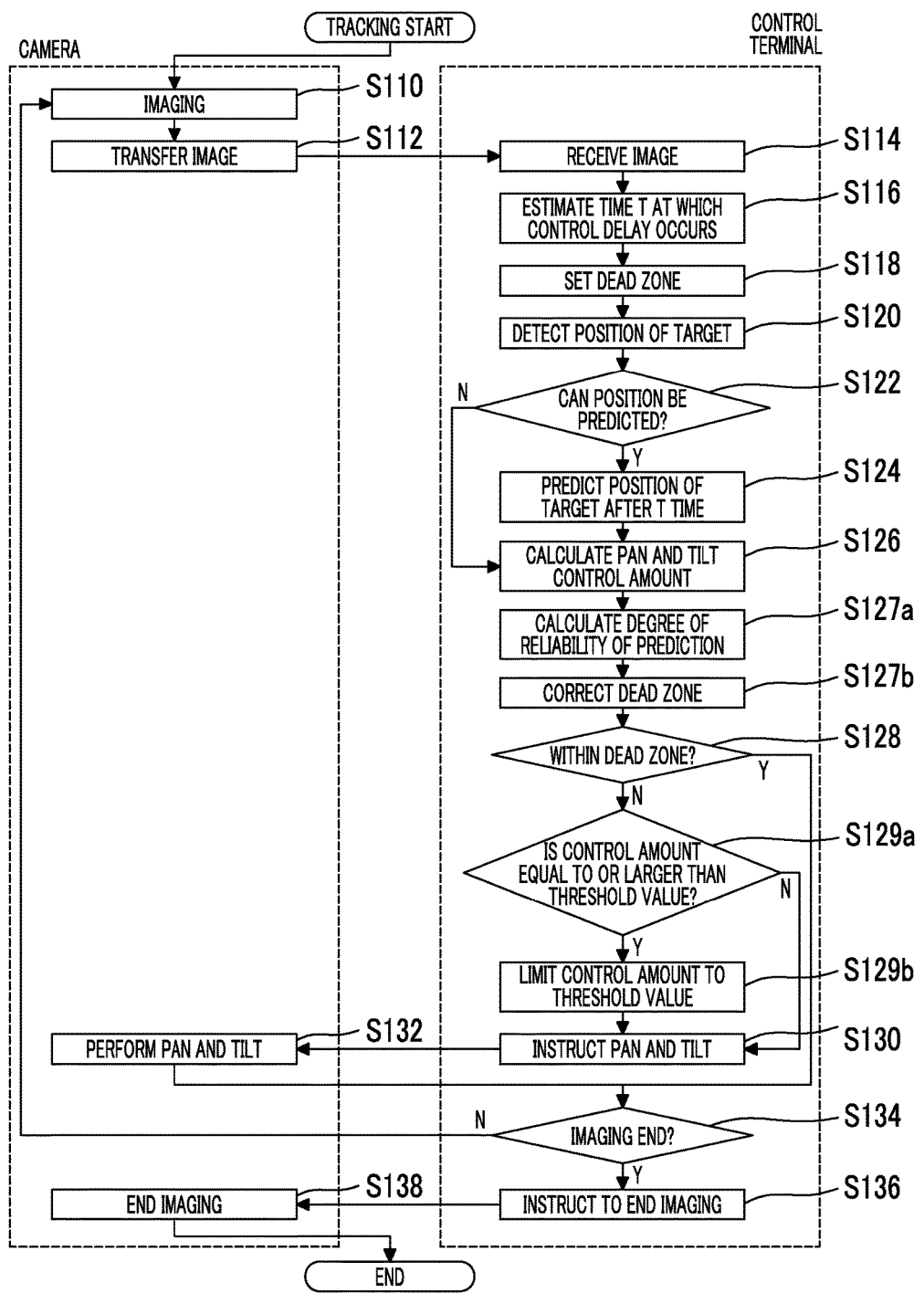
FIG. 22 is a flowchart illustrating a procedure of tracking control according to the fourth embodiment.

FIG. 22 is a flowchart illustrating a procedure of tracking control of the fourth embodiment.

The procedure is the same as procedure of the tracking control of the second embodiment described above except that a process of calculating the degree of reliability of the prediction and a process of correcting the dead zone are added. Accordingly, the process of calculating the degree of reliability of the prediction and the process of correcting the dead zone will be described herein.

As illustrated in FIG. 22, if the pan and tilt control amount is calculated in step S126, the control terminal 100 calculates the degree of reliability of the prediction (step S127a). That is, the degree of reliability of the prediction is calculated from the control delay time. As described above, the degree of reliability of the prediction decreases when the control delay time becomes longer.

The control terminal 100 corrects the dead zone according to the calculated degree of reliability of the prediction (step S127b). That is, the dead zone is corrected to increase when the degree of reliability decreases.

Then, the control terminal 100 determines whether or not, under the corrected dead zone, the target prediction position belongs to the dead zone (step S128), and instructs the camera 10 to be panned and tilted on the basis of a result of the determination.

Thus, according to this embodiment, the dead zone is corrected according to the degree of reliability of the prediction. Accordingly, it is possible to appropriately prevent the image from shaking little by little while improving following performance.

Although the configuration for increasing or decreasing the entire dead zone has been adopted in the above example, it is also possible to increase or decrease the dead zone on the basis of the state of the target, as in the third embodiment. That is, using the method of in this embodiment, it is possible to further correct the dead zone corrected using the method of the third embodiment. For example, it is possible to increase or decrease only the dead zone in the movement direction of the target to be predicted, according to the degree of reliability of the prediction.

Further, the degree of reliability of the prediction is calculated from the control delay time in the above example, but a method of calculating the degree of reliability of the prediction is not limited thereto. Further, for example, the degree of reliability of the prediction can be calculated from a history of success or failure of the detection of the target, or the degree of reliability of the prediction can be calculated from a history of the control delay time.

<<Fifth Embodiment of Tracking Control>>

In the above embodiment, the time T at which the control delay occurs is estimated on the basis of a state of communication between the camera 10 and the control terminal 100. In this embodiment, the time T at which the control delay occurs is also estimated on the basis of the operation state of the target position detection unit 214. That is, the control delay time is estimated in consideration of the time required for a process of detecting the position of the target.

Figure 23:
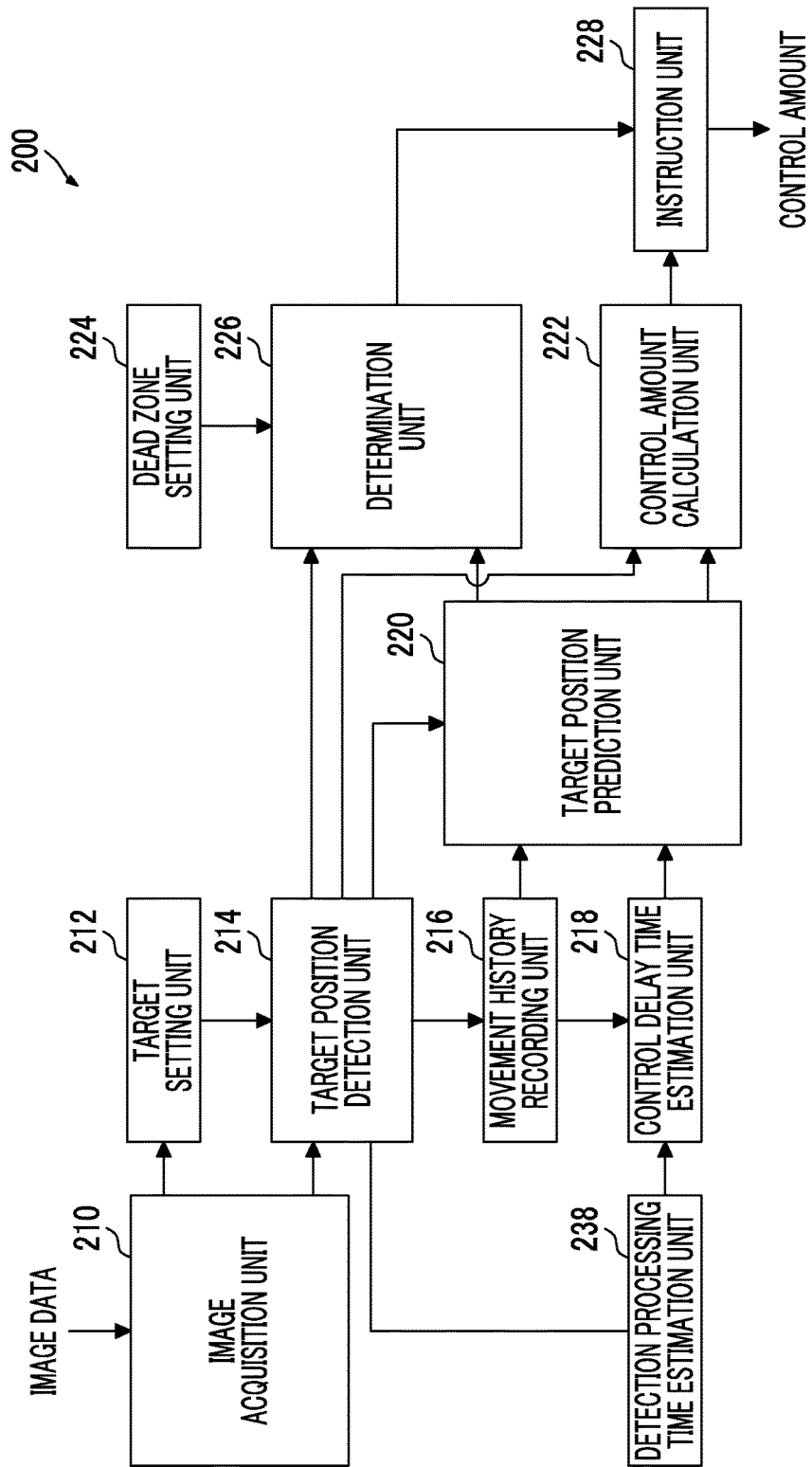
FIG. 23 is a block diagram illustrating a system configuration of a control terminal functioning as a tracking control device of a fifth embodiment.

FIG. 23 is a block diagram illustrating a system configuration of a control terminal functioning as the tracking control device of the fifth embodiment.

The tracking control device of this embodiment is different from the tracking control device in the above embodiment in that a detection processing time estimation unit 238 is included. Therefore, only the detection processing time estimation unit 238 will be described herein, other configurations are denoted by the same reference signs as those of the tracking control device in the above embodiment, and description thereof will be omitted.

The detection processing time estimation unit 238 estimates a time required for detection of the position of the target from the operation state of the target position detection unit 214. The time required for detection of the position of the target varies according to, mainly, a load on the CPU 110. Therefore, the detection processing time estimation unit 238 monitors the load on the CPU 110 and estimate the time required for detection of the position of the target.

The control delay time estimation unit 218 estimates a control delay time through addition of the detection processing time estimated by the detection processing time estimation unit 238. That is, the control delay time estimation unit 218 adds the detection processing time to the delay time obtained from the communication state to obtain the control delay time.

Thus, it is possible to improve prediction accuracy by estimating the control delay time in consideration of the time required for a process for detecting the position of the target.

Although the control delay time is estimated in consideration of the time required for the process of detecting the position of the target in this embodiment, other processing time can also be considered. Generally, since the time required for the process on the control terminal side varies according to a load on the CPU 110, it is effective to monitor the load on the CPU 110 and estimate a total control delay time.

<<Other Embodiments>>
<Modification Example of Camera>
<Modification Example (1) of Camera>

Although the pan and tilt function is realized by a mechanical structure in the above embodiment, the pan and tilt function can be realized electronically. That is, a portion of the captured image is cut out to generate image data for output, and the pan and/or tilt function is electronically realized by changing a range for cutting out the image for output.

Figure 24:
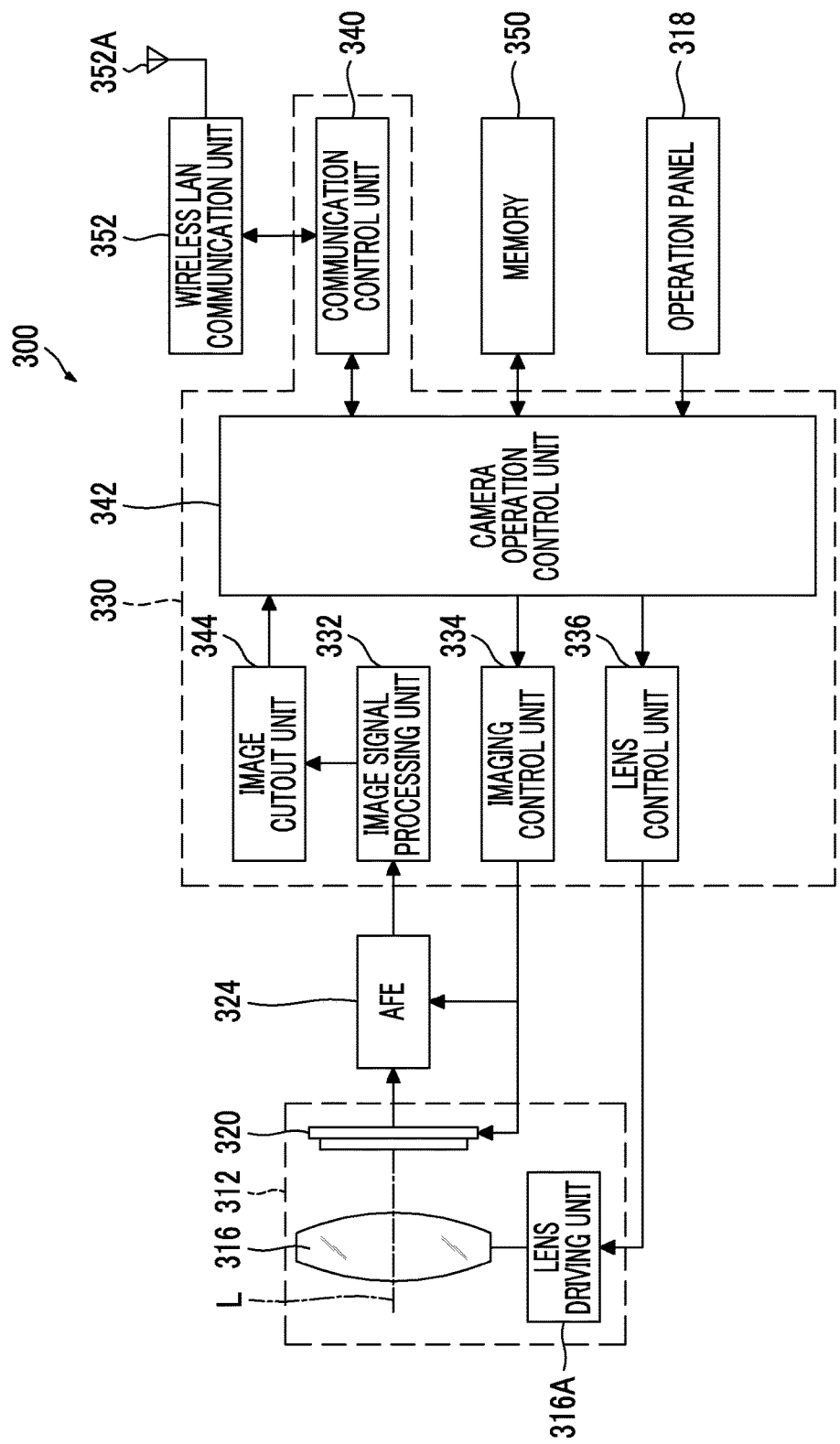
FIG. 24 is a block diagram illustrating a system configuration of a camera that electronically realizes a pan and tilt function.

FIG. 24 is a block diagram illustrating a system configuration of a camera that electronically realizes a pan and tilt function.

This camera 300 includes an imaging unit 312 that captures an optical image of a subject through a fisheye lens 316, an AFE 324, a camera control unit 330, a memory 350, and a wireless LAN communication unit 352.

The imaging unit 312 includes a fisheye lens 316, an image sensor 320 that receives light passing through the fisheye lens 316, and a lens driving unit 316A.

The fisheye lens 316 has a focusing function and is driven by the lens driving unit 316A so that a focus and an iris are adjusted. The fisheye lens 316 includes, for example, a diagonal fisheye lens.

The image sensor 320 includes a two-dimensional image sensor such as a CCD image sensor or a CMOS image sensor.

The AFE 324 performs, for example, signal processing such as noise removal, signal amplification, or A/D conversion on a signal (an image signal) output from the image sensor 320. The digital image signal generated by the AFE 324 is output to the camera control unit 330.

The memory 350 functions as a storage unit for various pieces of data, and reading and writing of data is performed according to a request from a camera operation control unit 342.

The wireless LAN communication unit 352 performs wireless LAN communication according to a predetermined wireless LAN standard with a wireless LAN access point or an external device capable of wireless LAN communication, via an antenna 352A.

The camera control unit 330 includes a microcomputer including a CPU and a memory, and functions as an image signal processing unit 332, an imaging control unit 334, a lens control unit 336, a communication control unit 340, a camera operation control unit 342, and an image cutout unit 344 by executing a predetermined program.

The image signal processing unit 332 performs required signal processing on the digital image signals acquired from the AFE 324 to generate digital image data. For example, the image signal processing unit 332 generates digital image data including image data of a luminance signal (Y) and image data of a color difference signal (Cr, Cb).

The imaging control unit 334 controls driving of the image sensor 320 to control imaging of the image sensor 320.

The lens control unit 336 controls the lens driving unit 316A to control focusing of the fisheye lens 316 and an operation of the iris.

The communication control unit 340 controls the wireless LAN communication unit 352 to control the wireless LAN communication with an external device.

The camera operation control unit 342 generally controls the operation of the entire camera according to instructions from the operation unit of the camera 300 and the control terminal (not illustrated).

The image cutout unit 344 acquires the image data generated by the image signal processing unit 332 and cuts out a portion of the image to generate image data for output. The image cutout unit 344 cuts out the image according to the instruction from the camera operation control unit 342, to generate image data for output. For example, an image with an instructed aspect ratio is cut out in an instructed size around an instructed coordinate position to generate image data for output.

Figure 25:
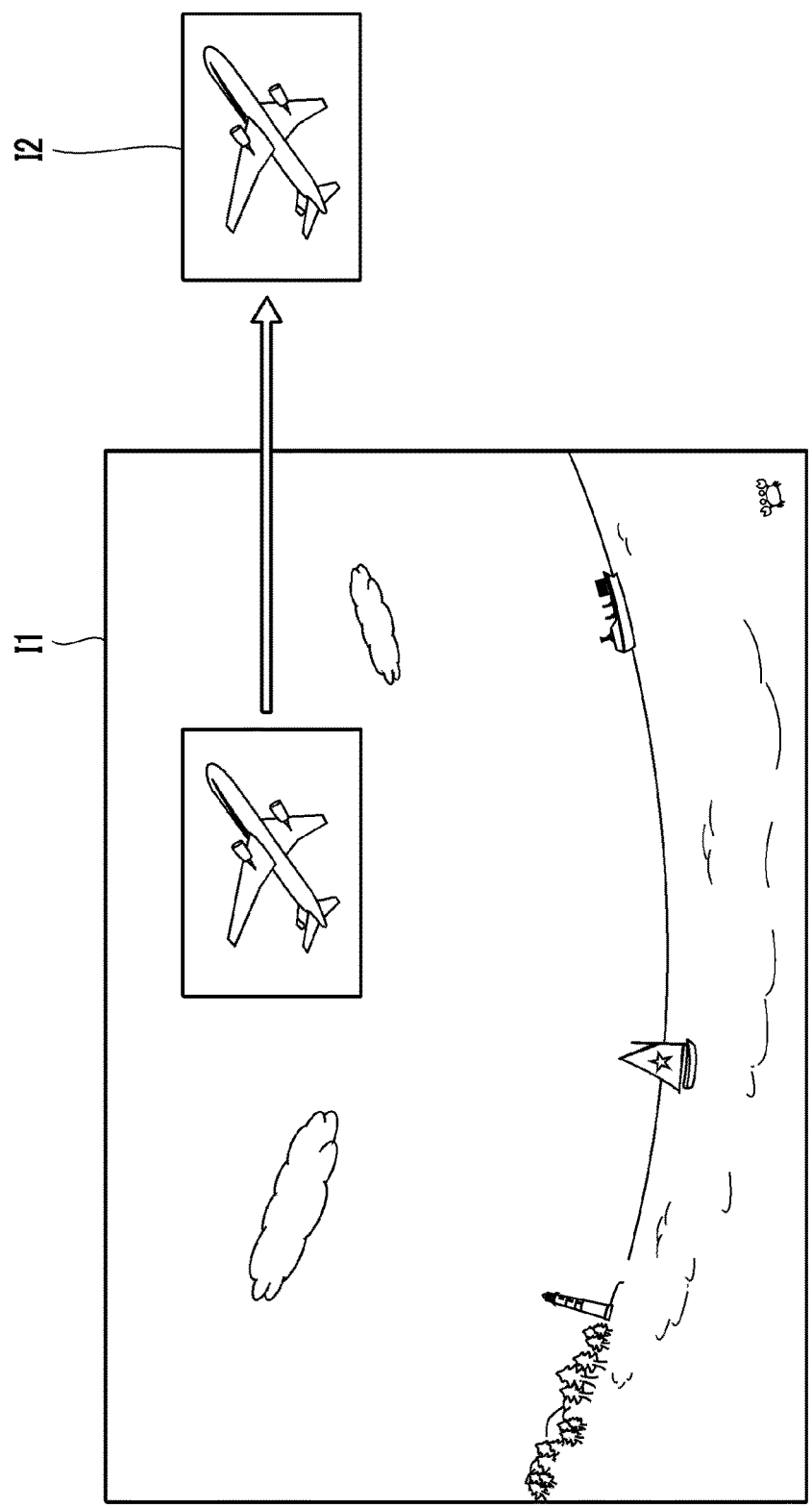
FIG. 25 is a conceptual diagram of image cutout in an image cutout unit.

FIG. 25 is a conceptual diagram of cutout of an image in the image cutout unit.

In FIG. 25, an image I1 is an image that is captured by the image sensor 320 via the fisheye lens 316. The image cutout unit 344 cuts out a portion of the image I1 and generates an image I2 for output.

The camera 300 outputs the image I2 cut out by the image cutout unit 344 as an image for output to the control terminal 100.

Figure 26:
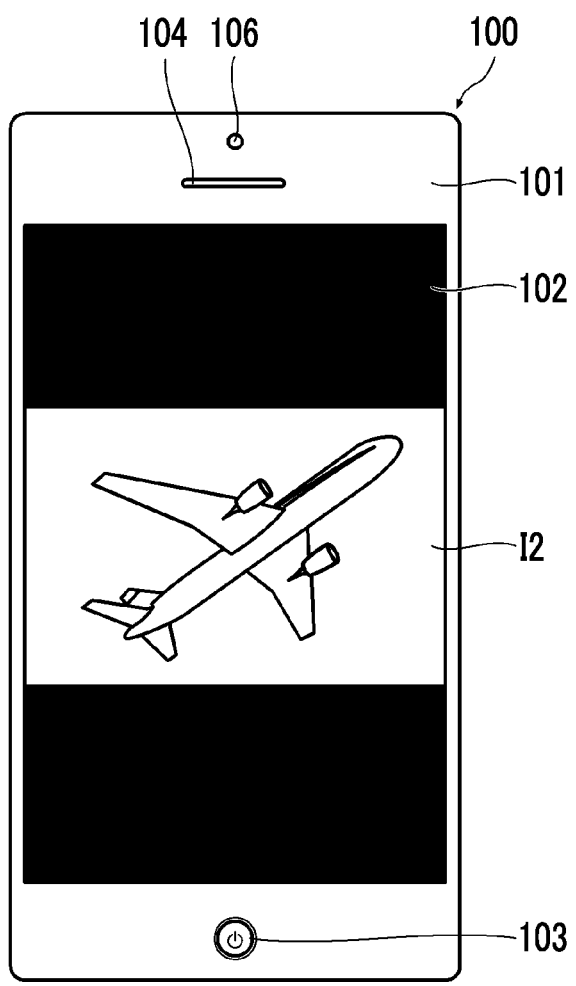
FIG. 26 is a diagram illustrating a screen display example of a display of a control terminal.

FIG. 26 is a diagram illustrating a screen display example of a display of the control terminal.

As illustrated in FIG. 26, an image I2 cut out from the image I1 captured through the fisheye lens 316 is displayed as the image captured by the camera 300 in the display 102 of the control terminal 100.

Thus, the camera 300 that electronically realizes a pan and tilt function is configured to cut out a portion of an actually imaged image and output image data and configured to be panned and/or tilted by changing a cutout position.

Although the configuration in which a portion of the image captured by the single imaging unit is cut out and the image data for output is acquired is adapted in the above example, a configuration in which a plurality of imaging units are included in the camera, images captured by the plurality of imaging units are combined to generate a single image, a portion of the image is cut out, and image data for output is acquired can be adopted. For example, a configuration in which a first imaging unit that images the front and a second imaging unit that images the rear are included, an image captured by the first imaging unit and an image captured by the second imaging unit are combined to generate one image, a camera capable of imaging 360° in a pan direction is formed, a portion of the image is cut out, and image data for output is acquired can be adopted.

<Modification Example (2) of Camera>

Although the camera 10 of the above embodiment includes the function of the pan and tilt function, the camera may include at least the pan or tilt function. In the case of a camera including only a pan function, tracking of the target is performed only in a pan operation. Similarly, in the case of a camera including only a tilt function, tracking of the target is performed only in a tilt operation.

<Modification Example of Target Setting Unit>

In the above-described embodiment, the image captured by the camera 10 is displayed on the display 102 and a subject on the screen touched by the user is set as the target, but a method of setting the target is not limited thereto.

For example, a configuration in which a function of automatically detecting a face of a person from the image captured by the camera (a function of the face detection unit) is added as a function of the tracking control device, and the face of the person detected using the function is automatically set as the target can be adopted. Accordingly, it is possible to simply set the target.

In this case, the plurality of faces may be detected, but in this case, for example, a configuration in which a result of the detection is displayed to the user and a subject is selected as the target can be adopted. Further, a configuration in which the target can be automatically determined from a size or a position of the detected face can be adopted. For example, a main subject is determined under a determination criterion that a face located at a center of the screen seems to be the main subject and a larger face seems to be the main subject, and the target is automatically determined.

Further, for example, a configuration in which a function of detecting a moving body from the image captured by the camera (a function of a moving body detection unit) is added as a function of the tracking control device, and a moving body first detected using the function is set as the target can be adopted. Accordingly, it is possible to simply set the target.

In this case, a plurality of moving bodies may be detected at the same time, but in this case, a configuration in which a user is caused to select the subject that is a target can be adopted. Alternatively, a configuration in which the target is automatically determined from a size or a position of the detected moving body can be adopted.

Further, although the tracking frame having a predetermined size is set on the basis of touch position information in the above embodiment, the position and the size of the tracking frame may be adjusted by the user.

Further, a position and a size of the tracking frame may be automatically adjusted. For example, a moving body may be extracted with reference to the touch position and the tracking frame may be set to surround the moving body.

Alternatively, a face of a person may be extracted with reference to a touch position and the tracking frame may be set to surround the face.

Further, although the image captured by the camera is displayed on the display of the control terminal in real time and the target is selected in the above embodiment, a configuration in which a still image is captured and displayed on the display and the target is selected can be adopted.

Further, a configuration in which the image of the target is registered in advance and read to set the target can be adopted.

<Connection Form Between Camera and Control Terminal>

Although the camera and the control terminal are connected wirelessly communicatably in the above embodiment, the camera and the control terminal may be connected mutually communicatably. Therefore, the camera and the control terminal may be connected communicatably in a wired manner. Further, a communication standard or the like is not particularly limited. Further, the camera and the control terminal are not directly connected and, for example, the camera and the control terminal may be connected over the Internet.

<Control Terminal>

In the above embodiment, the smart phone is adopted as the control terminal, but the form of the control terminal is not particularly limited. Therefore, the control terminal can include a personal computer or a tablet computer. Further, the control terminal can be configured as a dedicated device.

<Detection of Time Required for Transmission and Reception of Data>

In the above embodiment, the time required for transmission and reception of data is detected on the basis of a reception interval of image data, but a method of detecting the time required for transmission and reception of data is not limited thereto. Further, for example, a configuration in which means for detecting a communication speed is included in the control terminal, and time required for transmission and reception of data is detected on the basis of a result of the detection can be adopted.

EXPLANATION OF REFERENCES

1: automatic tracking imaging system
10: camera
12: imaging unit
12A: housing
14: head portion
14A: base frame
14B: rotating frame
16: lens
16A: lens driving unit
18: operation panel
20: image sensor
22P: pan driving unit
22T: tilt driving unit
30: camera control unit
32: image signal processing unit
34: imaging control unit
36: lens control unit
38P: pan control unit
38T: tilt control unit
40: communication control unit
42: camera operation control unit
50: memory
52: wireless LAN communication unit 52A: antenna
100: control terminal
101: housing
102: display
103: operation button
104: speaker
105: microphone
106: built-in camera
110: CPU
112: system bus
114: main memory
116: nonvolatile memory
118: mobile communication unit
118A: antenna
120: wireless LAN communication unit
120A: antenna
122: short-range wireless communication unit
122A: antenna
124: display unit
126: touch panel input unit
128: key input unit
130: audio processing unit
132: image processing unit
200: tracking control device
210: image acquisition unit
212: target setting unit
214: target position detection unit
216: movement history recording unit
218: control delay time estimation unit
220: target position prediction unit
222: control amount calculation unit
224: dead zone setting unit
226: determination unit
228: instruction unit
230: control amount determination unit
232: control amount correction unit
234: dead zone changing unit
236: prediction degree of reliability calculation unit
238: detection processing time estimation unit
300: camera
312: imaging unit
316: fisheye lens
316A: lens driving unit
320: image sensor
324: AFE
330: camera control unit
332: image signal processing unit
334: imaging control unit
336: lens control unit
340: communication control unit
342: camera operation control unit
344: image cutout unit
350: memory
352: wireless LAN communication unit
352A: antenna
DP: pan direction
DT: tilt direction
DZ: dead zone
PC: position of target detected from image
PO: target arrangement position
PT: target prediction position

What is claimed is:

1. A tracking control device that remotely controls a pan and/or tilt operation of a camera having a pan and/or tilt function and causes the camera to track a target, the device comprising:

a processor configured to:
  detect a position of the target on the basis of an image captured by the camera;
  estimate a time T at which a control delay occurs on the basis of at least a state of communication with the camera;
  predict a position of the target after the time T as a target prediction position;
  calculate a control amount of pan and/or tilt of the camera required to move a target arrangement position set in an imaging screen of the camera as a position at which the target is arranged, to the target prediction position;
  determine whether or not the target prediction position belongs to a dead zone set with reference to the target arrangement position; and
  instruct the camera to execute the pan and/or tilt with the control amount in a case where the processor determines that the target prediction position does not belong to the dead zone,
wherein the processor is further configured to change the dead zone,
wherein the processor is further configured to calculate a degree of reliability of prediction, and
wherein the processor is further configured to increase or decrease the dead zone according to the degree of reliability that is calculated.

2. The tracking control device according to claim 1, wherein the processor is further configured to estimate a time T at which a control delay occurs on the basis of an operation state of the processor.

3. The tracking control device according to claim 1, wherein the processor is further configured to predict the target prediction position on the basis of a movement history of the target.

4. The tracking control device according to claim 1, wherein the processor is further configured to correct:
  the control amount to a threshold value in a case where the control amount is equal to or larger than the threshold value.

5. The tracking control device according to claim 4, wherein the threshold value is set to the same value as a size of the dead zone that is set with reference to the target arrangement position.

6. The tracking control device according to claim 1, wherein the processor is further configured to acquire information on a speed of the target, and to increase or decrease the dead zone according to the speed of the target.

7. The tracking control device according to claim 1, wherein the processor is further configured to acquire information on an acceleration of the target, and to increase or decrease the dead zone according to the acceleration of the target.

8. The tracking control device according to claim 1, wherein the processor is further configured to acquire information on a size of the target, and to increase or decrease the dead zone according to the size of the target.

9. The tracking control device according to claim 1, wherein the processor is further configured to acquire information on a distance from the camera to the target, and to increase or decrease the dead zone according to the distance from the camera to the target.

10. The tracking control device according to claim 1, wherein the target is a person, and
the processor is further configured to acquire information on an orientation of a face of the person, and to decrease the dead zone in the same direction as the orientation of the face of the person.

11. The tracking control device according to claim 1, wherein the processor is further configured to acquire information on the target prediction position, and to decrease the dead zone in a direction in which the target is predicted to move.

12. The tracking control device according to claim 11, wherein the processor is further configured to acquire information on the control amount, and to increase or decrease the dead zone according to magnitude of the control amount.

13. The tracking control device according to claim 1, further comprising:
a display that displays an image captured by the camera.

14. The tracking control device according to claim 13, wherein the processor is further configured to:
designate a position on a display screen of the display; and
set a subject at the position that is designated as the target.

15. The tracking control device according to claim 1, wherein the processor is further configured to:
detect a face of a person from an image captured by the camera; and
set the face of the person that is detected as the target.

16. The tracking control device according to claim 1, wherein the camera comprises:
an imaging sensor that captures an optical image of the subject through a lens; and
a head portion that pans and/or tilts the imaging sensor.

17. The tracking control device according to claim 1, wherein the camera includes
an imaging sensor that captures an optical image of a subject through a lens; and
a processor that cuts out a part of the image captured by the imaging sensor, and
are electronically panned and/or tilted by moving a position of the image that is cut out.

18. A tracking control method of remotely controlling a pan and/or tilt operation of a camera having a pan and/or tilt function at a control terminal and causing the camera to track a target, the method comprising the steps of:
detecting a position of the target on the basis of an image captured by the camera;
estimating a time T at which a control delay occurs on the basis of at least a state of communication between the camera and the control terminal;
predicting a position of the target after the time T as a target prediction position;
calculating a control amount of pan and/or tilt of the camera required to move a target arrangement position set in an imaging screen of the camera as a position at which the target is arranged, to the target prediction position;
determining whether or not the target prediction position belongs to a dead zone set with reference to the target arrangement position; and
instructing the camera to execute the pan and/or tilt with the control amount in a case where the target prediction position is determined not to belong to the dead zone,
wherein the dead zone is changed,
wherein a degree of reliability of prediction is calculated, and
wherein the dead zone is increased or decreased according to the degree of reliability that is calculated.

19. An automatic tracking imaging system that remotely controls a pan and/or tilt operation of a camera having a pan and/or tilt function in a control terminal and images a target while automatically tracking the target,
wherein the control terminal comprises
a processor configured to:
detect a position of the target on the basis of an image captured by the camera;
estimate a time T at which a control delay occurs on the basis of at least a state of communication with the camera;
predict a position of the target after the time T as a target prediction position;
calculate a control amount of pan and/or tilt of the camera required to move a target arrangement position set in an imaging screen of the camera as a position at which the target is arranged, to the target prediction position;
determine whether or not the target prediction position belongs to a dead zone set with reference to the target arrangement position; and
instruct the camera to execute the pan and/or tilt with the control amount in a case where the target prediction position is determined not to belong to the dead zone,
wherein the processor is further configured to change the dead zone,
wherein the processor is further configured to calculate a degree of reliability of prediction, and
wherein the processor is further configured to increase or decrease the dead zone according to the degree of reliability that is calculated.

20. A computer-readable non-transitory tangible medium having a tracking control program recorded thereon for remotely controlling a pan and/or tilt operation of a camera having a pan and/or tilt function and causing the camera to track a target, the tracking control program causes a computer to realize:
a function of acquiring an image captured by the camera;
a function of detecting a position of the target on the basis of the acquired image;
a function of estimating a time T at which a control delay occurs on the basis of at least a state of communication with the camera;
a function of predicting a position of the target after the time T as a target prediction position;
a function of calculating a control amount of pan and/or tilt of the camera required to move a target arrangement position set in an imaging screen of the camera as a position at which the target is arranged, to the target prediction position;
a function of determining whether or not the target prediction position belongs to a dead zone set with reference to the target arrangement position; and
a function of instructing the camera to execute the pan and/or tilt with the control amount in a case where the target prediction position is determined not to belong to the dead zone,
wherein the dead zone is changed,
wherein a degree of reliability of prediction is calculated, and
wherein the dead zone is increased or decreased according to the degree of reliability that is calculated.

* * * * *